US012763275B2

(12) United States Patent
Edo et al.

(10) Patent No.: US 12,763,275 B2
(45) Date of Patent: Oct. 13, 2026

(54) SWITCHING DEVICE

(71) Applicant: Mitsubishi Electric Corporation, Tokyo (JP)

(72) Inventors: Takahiro Edo, Tokyo (JP); Yasunori Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 264 days.

(21) Appl. No.: 18/287,652

(22) PCT Filed: Apr. 28, 2021

(86) PCT No.: PCT/JP2021/016924

§ 371 (c)(1),
(2) Date: Oct. 20, 2023

(87) PCT Pub. No.: WO2022/230095

PCT Pub. Date: Nov. 3, 2022

(65) Prior Publication Data

US 2024/0186089 A1 Jun. 6, 2024

(51) Int. Cl.
*H01H 33/78* (2006.01)
*H01H 33/18* (2006.01)
*H01H 33/98* (2006.01)

(52) U.S. Cl.
CPC .......... *H01H 33/78* (2013.01); *H01H 33/182* (2013.01); *H01H 33/982* (2013.01)

(58) Field of Classification Search
CPC ...... H01H 1/385; H01H 9/443; H01H 33/182; H01H 33/78; H01H 33/982; H01H 33/765; H01H 33/7015; H01H 33/74; H01H 33/98

(Continued)

(56) References Cited

U.S. PATENT DOCUMENTS 2,089,050 A 8/1937 Burmeister
2,267,399 A 12/1941 Farrer et al.
(Continued)

FOREIGN PATENT DOCUMENTS

CN 105122411 A 12/2015
DE 10 2009 043 195 A1 3/2011
(Continued)

OTHER PUBLICATIONS

Translation of JP2010244742 (original document published Oct. 23, 2010) (Year: 2010).*

(Continued)

*Primary Examiner* — William A Bolton
(74) *Attorney, Agent, or Firm* — XSENSUS LLP

(57) ABSTRACT

A switching device includes an electrode housing having an opening; a first electrode provided inside the electrode housing; and a second electrode that fits in the opening such that the second electrode comes into and out of contact with the first electrode. The electrode housing generates an ablation gas through an arc generated between the first electrode and the second electrode. Until the first electrode and the second electrode become separated by a certain distance, a gas including the ablation gas is retained in an enclosed space defined by the first electrode, the second electrode, and the electrode housing. When a distance by which the first electrode and the second electrode are separated from each other exceeds the certain distance, the gas in the enclosed space is discharged through a gap defined between the opening and the second electrode, such that the gas is blown onto the arc.

4 Claims, 17 Drawing Sheets

(58) Field of Classification Search
USPC ................. 218/1, 12, 13, 16, 18, 19, 27, 30; 200/400
See application file for complete search history.

(56) References Cited

U.S. PATENT DOCUMENTS

| | | | | |
|---|---|---|---|---|
| 3,995,130 | A | 11/1976 | Mauthe et al. | |
| 8,106,326 | B2 * | 1/2012 | Nakauchi | H01H 31/003 218/55 |
| 8,779,316 | B2 * | 7/2014 | Drews | H01H 33/74 218/51 |
| 8,902,026 | B2 * | 12/2014 | Fujita | H01H 33/182 218/27 |
| 9,613,762 | B2 * | 4/2017 | Nukaga | H01H 3/62 |
| 10,115,548 | B2 * | 10/2018 | Nakamura | H01H 33/76 |
| 10,796,869 | B2 * | 10/2020 | Monka | H01H 33/7084 |
| 2007/0119819 | A1 * | 5/2007 | Asokan | H01H 9/302 218/90 |
| 2014/0360984 | A1 * | 12/2014 | Moriyama | H01H 33/12 218/146 |
| 2015/0380188 | A1 | 12/2015 | Sakuyama et al. | |
| 2016/0049268 | A1 * | 2/2016 | Rokunohe | H01H 33/182 218/27 |
| 2018/0012716 | A1 | 1/2018 | Nakamura et al. | |
| 2018/0277323 | A1 | 9/2018 | Sakuyama et al. | |
| 2019/0362913 | A1 | 11/2019 | Yamada et al. | |
| 2021/0043401 | A1 * | 2/2021 | Ye | H01H 33/703 |

FOREIGN PATENT DOCUMENTS

| | | | | |
|---|---|---|---|---|
| EP | 3872829 | A1 | 9/2021 | |
| GB | 1 483 635 | A | 8/1977 | |
| JP | H08-212882 | A | 8/1996 | |
| JP | H09-063432 | A | 3/1997 | |
| JP | H10-312730 | A | 11/1998 | |
| JP | 2002-334636 | A | 11/2002 | |
| JP | 2007-012518 | A | 1/2007 | |
| JP | 2007-335148 | A | 12/2007 | |
| JP | 2010244742 | * | 10/2010 | H01H 33/70 |
| JP | 2018-160436 | A | 10/2018 | |
| JP | 2020-161459 | A | 10/2020 | |
| WO | 2014/171208 | A1 | 10/2014 | |
| WO | 2018/150564 | A1 | 8/2018 | |
| WO | 2020/084984 | A1 | 4/2020 | |

OTHER PUBLICATIONS

International Search Report and Written Opinion mailed on Jul. 27, 2021, received for PCT Application PCT/JP2021/016924, filed on Apr. 28, 2021, 9 pages including English Translation.

Notice of Reasons for Refusal mailed on Oct. 18, 2022, received for JP Application 2022-555727, 11 pages Including English Translation.

Extended European Search Report issued May 10, 2024 in European Patent Application No. 21939256.0, 10 pages.

Office Action issued Dec. 22, 2025 in European Patent Application No. 21 939 256.0, 6 pages.

Office Action issued Apr. 23, 2026 in Chinese Patent Application No. 202180097376.7, 13 pages.

* cited by examiner

SWITCHING DEVICE

CROSS-REFERENCE TO RELATED APPLICATION

This application is based on PCT filing PCT/JP2021/016924, filed Apr. 28, 2021, the entire contents of which are incorporated herein by reference.

FIELD

The present disclosure relates to switching devices that open and close electrical circuits in electric power systems, such as disconnectors, grounding switches, and circuit breakers.

BACKGROUND

For a switching device, an arc is generated between electrodes when the electrodes, which contacted each other in closed positions, become separated into open positions inside a tank enclosing an insulating gas such as SF6 gas or dry air, for example.

In addition to a demand for improvement of arc extinguishing performance for efficient arc extinction, there has been a demand for greater compactness of gas-insulated switchgear for application to urban underground substations and improved economic efficiency. Among measures taken to further improve the arc extinguishing performance are, for example, to strengthen an operating force of an operating device and provide a separate mechanism that blows the gas onto the arc. Unfortunately, these measures lead to an increase in size of the switching device.

A magnetic arc drive method and an ablation cooling method, which are described in Patent Literature 1, are example methods for restraining the increase in device size and improving the arc extinguishing performance.

The magnetic arc drive method described in Patent Literature 1 improves the arc extinguishing performance by rotating an arc generated between a stationary electrode and a movable electrode, using a magnetic field generated by a spiral electrode provided separately from the stationary electrode and the movable electrode, when the electrodes move to open positions. The ablation cooling method described in Patent Literature 1 involves attaching an insulating cover to a vicinity of an arc generation part of the electrode and cooling an arc with an ablation gas generated from the insulating cover when an arc magnetically driven by a spiral electrode comes into contact with the insulating cover.

In recent years, switching devices have been required to further improve the arc extinguishing performance. Meanwhile, it is expected that dry air, CO2, etc. will be used as an insulating gas in place of an SF6 gas having high arc extinguishing performance. Alternatively, an extension of arc duration time is expected given an increasing required interruptible current values.

A problem with the magnetic drive using the spiral electrode according to the invention described in Patent Literature 1 is that the arc extinguishing performance is degraded because an increased wear of the spiral electrode resulting from the extension of arc duration diminishes effectiveness of the magnetic drive.

CITATION LIST

Patent Literature

Patent Literature 1: Japanese Patent Application Laid-open No. 2020-161459

SUMMARY OF INVENTION

Problem to be Solved by the Invention

The present disclosure has been made to solve a problem such as the above and provides a switching device that can improve arc extinguishing performance without using a spiral electrode serving as a magnetic drive mechanism.

Means to Solve the Problem

A switching device according to the present disclosure comprises: an electrode housing having an opening; a first electrode provided inside the electrode housing; and a second electrode to fit in the opening of the electrode housing in an insertable and detachable manner such that the second electrode comes into and out of contact with the first electrode inside the electrode housing, wherein the electrode housing includes an arc extinguishing member to generate an ablation gas through an arc generated between the first electrode and the second electrode, until the first electrode and the second electrode become separated by a certain distance out of contact with each other, a gas including the ablation gas is retained in an enclosed space defined by the first electrode, the second electrode, and the electrode housing, and when a distance by which the first electrode and the second electrode are separated from each other exceeds the certain distance, the gas in the enclosed space is discharged through a gap defined between the opening and the second electrode moving away from the opening, such that the gas is blown onto the arc.

Effects of the Invention

The switching device according to the present disclosure can improve the arc extinguishing performance without using an arc extinguishing performance improvement method relying on the spiral electrode serving as the magnetic arc drive mechanism, and prevent the arc extinguishing performance from decreasing because of the wear of the spiral electrode.

DESCRIPTION OF EMBODIMENTS

Figure 1:
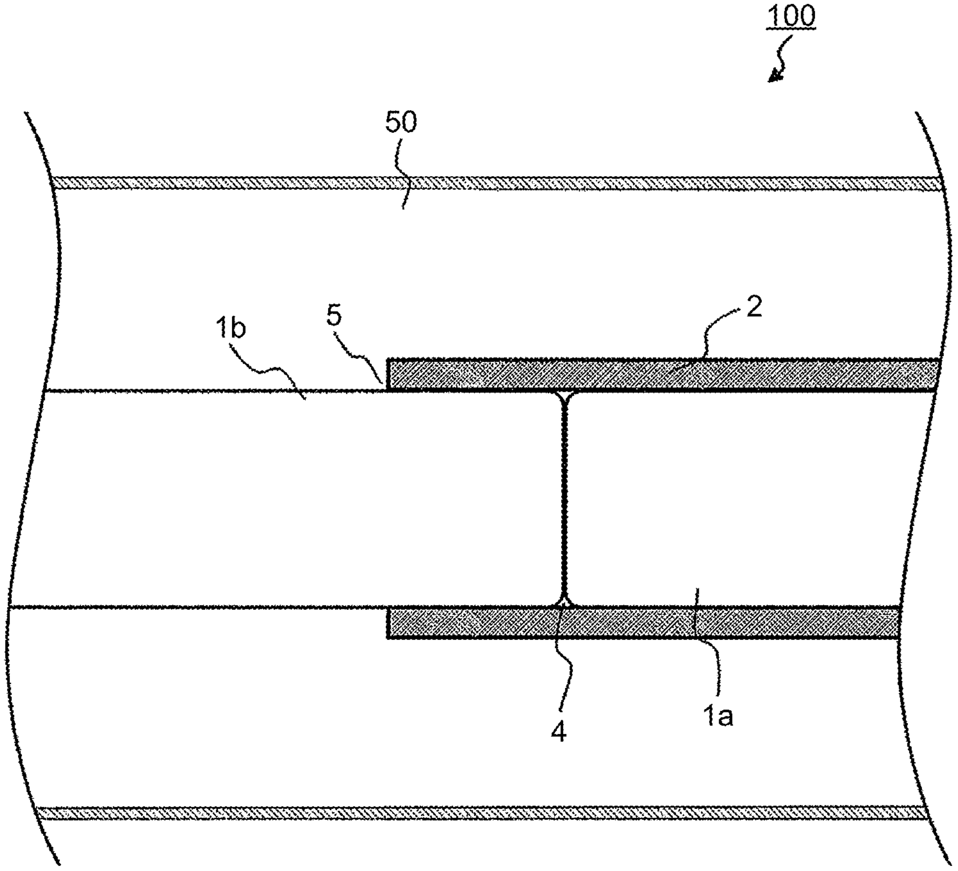
FIG. 1 is a schematic sectional view illustrating a closed state of a switching device according to a first embodiment.

With reference to the drawings, a description is hereinafter provided of embodiments according to the present disclosure. In the following embodiments, identical or similar constituent elements have the same reference characters.

First Embodiment

Figure 2:
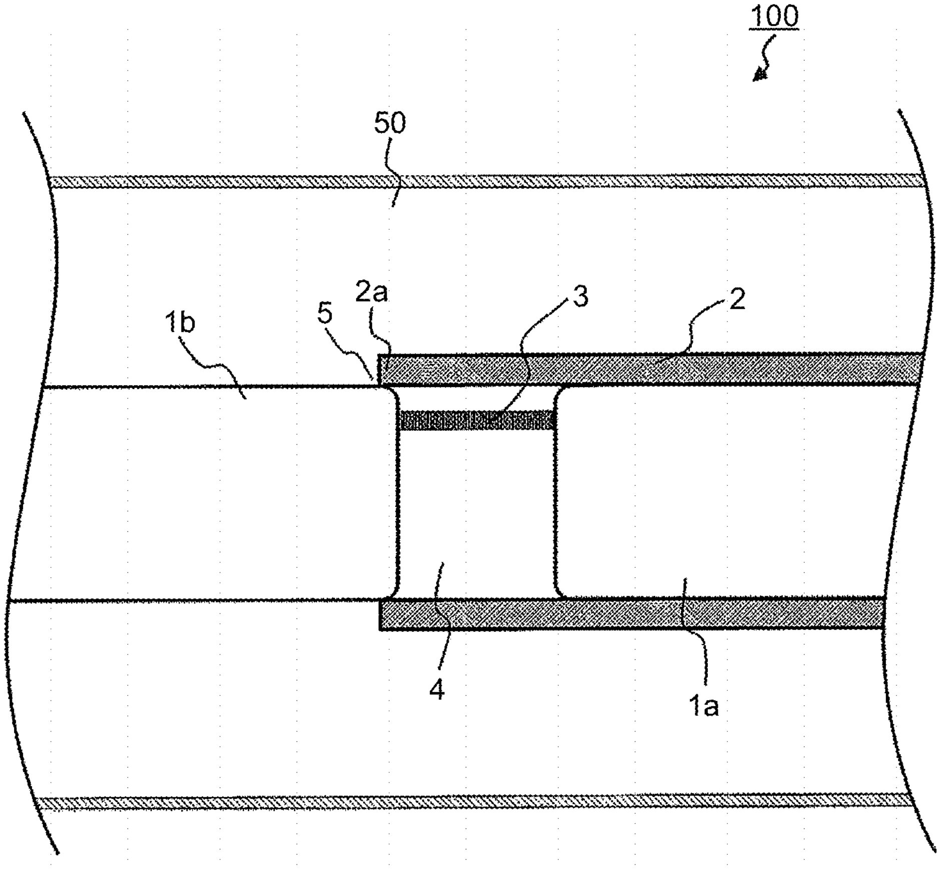
FIG. 2 is a schematic sectional view illustrating an open state of an internal space of the switching device according to the first embodiment.
Figure 3:
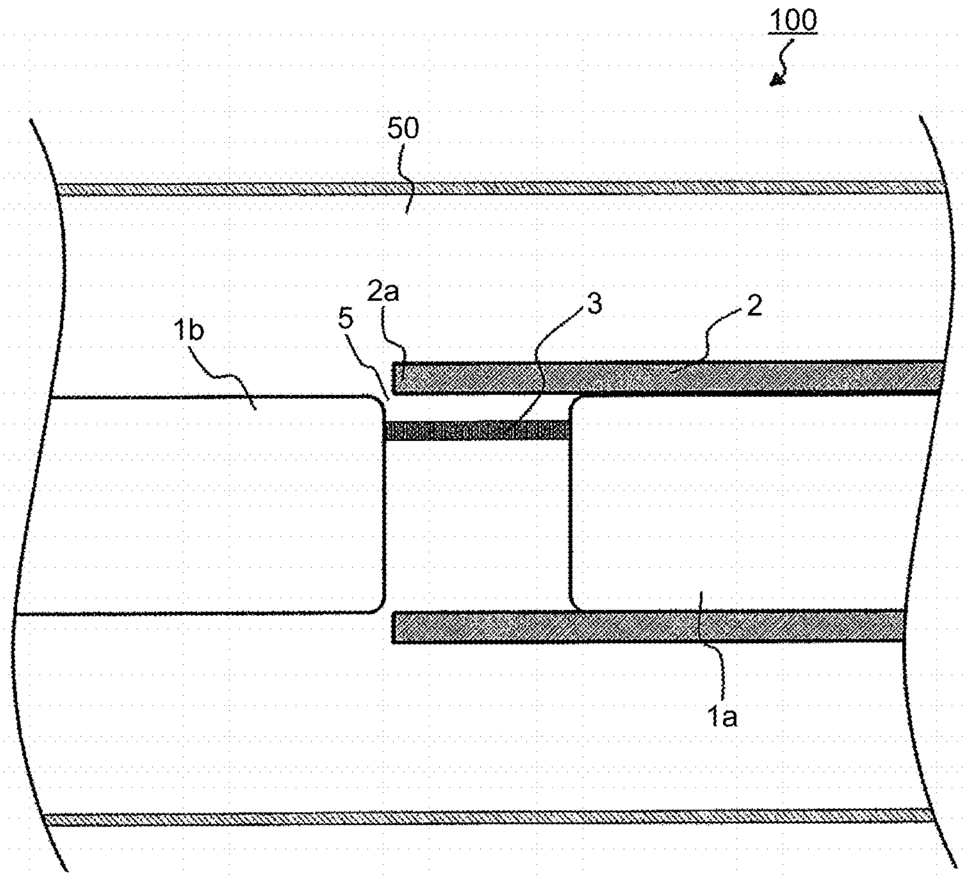
FIG. 3 is a schematic sectional view illustrating an open state of the switching device according to the first embodiment.

FIGS. 1, 2, and 3 each illustrate a switching device 100 according to a first embodiment in a closed state, a partially open state with an internal space during interruption, and an open state after an opening action advances out of the internal space. FIGS. 1 to 3 are schematic diagrams illustrating sections in a right-and-left direction of the drawing that is the direction of movement of a pair of electrodes into or out of contact with each other.

FIG. 1 is a schematic sectional view illustrating the closed state of the switching device 100 according to the first embodiment with the pair of electrodes, i.e., a first electrode 1*a* and a second electrode 1*b* in contact with each other.

As illustrated in FIG. 1, the switching device 100 includes an electrode housing 2, the first electrode 1*a*, and the second electrode 1*b*, inside a tank 50 enclosing an insulating gas. The electrode housing 2 has an opening 5. The first electrode 1*a* is provided inside the electrode housing 2. The second electrode 1*b* fits in the opening 5 of the electrode housing 2 in an insertable and detachable manner such that the second electrode 1*b* comes into and out of contact with the first electrode 1*a* inside the electrode housing 2.

While the first electrode 1*a* provided inside the electrode housing 2 and the second electrode 1*b* inserted into and detached from the opening 5 of the electrode housing 2 are illustrated in FIG. 1 and the subsequent drawings as being formed of conductors alone, each of the first and second electrodes 1*a* and 1*b* may, for example, include another member such as a flange to fill a gap between the first and second electrodes 1*a* and 1*b* and the electrode housing 2. A description is hereinafter provided of the example case where the first electrode 1*a* and the second electrode 1*b* are formed of the conductors alone.

As illustrated in FIG. 1, the first electrode 1*a* and the second electrode 1*b* are disposed facing each other and serve as the pair of electrodes of the same diameter that come into or out of contact with each other. For example, the first electrode 1*a* refers to one of the pair of electrodes, and the second electrode 1*b* refers to the other electrode that comes into or out of contact with the first electrode 1*a*, facing the first electrode 1*a*.

The electrode housing 2 is disposed to cover this pair of electrodes and is, for example, cylindrical.

The electrode housing 2 includes an arc extinguishing member that generates an ablation gas. For example, at least one compound selected from the group consisting of polytetrafluoroethylene (PTFE), polyethylene (PE), polyethylene terephthalate (PET), a perfluoroalkyl vinyl ether copolymer (PFA), a perfluoroether polymer, a fluoroelastomer, and a 4-vinyloxy-1-butene (BVE) cyclopolymer is used for the arc extinguishing member.

While the arc extinguishing member defines the entire electrode housing 2 in the example given herein, the electrode housing 2 may have a cylindrical portion formed of a different member, and the cylindrical portion may have the arc extinguishing member provided on a radially inner surface thereof. The electrode housing 2 may have the arc extinguishing member provided at an entire periphery of its radially inner side or only at a portion of the entire periphery. A description is hereinafter provided of the example case where the arc extinguishing member defines the entire electrode housing 2.

Also provided inside the tank 50 are a drive mechanism (not illustrated) that drives the electrode and a mechanically connected connection part (not illustrated) that supports the electrode, the electrode housing, and others.

FIG. 2 is a schematic sectional view illustrating the open state of the switching device 100 with a sealed space, i.e., an enclosed space 4 defined by the first electrode 1*a*, the second electrode 1*b*, and the electrode housing 2 as a result of the separation of the pair of electrodes, i.e., the first and second electrodes 1*a* and 1*b* out of contact with each other.

The second electrode 1*b* is separated from the first electrode 1*a* by moving in the direction opposite to the first electrode 1*a*. At the same time as that separation, an arc 3 is struck between the electrodes. In other words, the arc 3 is generated between the first electrode 1*a* and the second electrode 1*b* in the enclosed space 4.

The opening action of the first and second electrodes 1*a* and 1*b* progress leaving the enclosed space 4 formed, such that the first electrode 1*a* and the second electrode 1*b* become separated from each other by a certain distance. The certain distance as used herein refers to a distance between the first electrode 1*a* and the second electrode 1*b* separated to provide the maximum volume of the enclosed space 4.

The electrode housing 2 has the opening 5 in an electrode housing end 2*a* that is an end closer to the second electrode 1*b*. FIG. 2, illustrates the second electrode 1*b* in contact with the electrode housing end 2*a*. The enclosed space 4 formed just before the second electrode 1*b* moves away from the opening 5 of the electrode housing end 2*a* has the maximum volume. The enclosed space 4 is closed by contact between an outside-diameter surface of the second electrode 1*b* and an inside-diameter surface of the electrode housing 2.

While a closing action or the opening action described herein refers to the movement of the second electrode 1*b* in the left-right direction of the drawing into or out of contact with the first electrode 1*a*, the opening action may be the movement of the electrode housing 2 and the first electrode 1*a* in the direction opposite to the second electrode 1*b*.

During the progression of the opening action, the electrode housing 2 is contacted by the arc 3 or irradiated with arc discharge light associated with discharge of the arc 3, thereby generating the ablation gas. Until the first and second electrodes 1*a* and 1*b* become separated from each other by the certain distance out of contact with each other, a gas including the ablation gas and the insulating gas is retained in the enclosed space 4. This increasing ablation gas promotes cooling of the arc 3. Furthermore, the generation of the generated ablation gas increases a pressure in the enclosed space 4 to a higher pressure.

During the period of the opening action in which to form the enclosed space 4, an entire side surface of the arc 3 is exposed to the enclosed space 4 covered by the electrode housing 2. The electrode housing 2 can thus more efficiently receive the arc discharge light, thereby generating an increased amount of ablation gas. The increasing ablation gas increases the pressure in the enclosed space 4 to a higher pressure than a pressure in a space external to the enclosed space 4 and internal to the tank 50.

As discussed above, the electrode housing 2 may have the arc extinguishing member defining a portion of the radially inner side, such as a surface exposed to the enclosed space 4, provided that the arc causes the generation of the ablation gas. Alternatively, at least one of the first electrode 1*a* and the second electrode 1*b* may include the arc extinguishing member defining a surface thereof exposed to the enclosed space 4. Since the electrode (s) or the electrode housing includes the arc extinguishing member to generate the ablation gas, arc extinction is effected by such a simple structure.

FIG. 3 illustrates the open state of the switching device 100 with the pair of electrodes further separated from each other.

The open state advances by the further movement of the second electrode 1*b* in the direction opposite to the first electrode 1*a*, i.e., in a leftward opening direction of the drawing. When a distance by which the first electrode 1*a* and the second electrode 1*b* are separated from each other exceeds the certain distance, the opening 5 appears between the second electrode 1*b* and the electrode housing end 2*a*, such that the enclosed space 4 opens through the opening 5 to the space external to the enclosed space 4. The enclosed space 4 is opened and thus becomes an opened space, whereupon the highly pressurized gas in the enclosed space 4 is instantly discharged outward through a gap defined between the opening 5 and the second electrode 1*b* moving away from the opening 5, such that a great amount of the gas serving as an arc quenching means that extinguishes the arc 3 is blown onto the arc 3. With this arc quenching means, the arc 3 is extinguished.

This improves arc extinguishing performance and shortens a arc duration as well, which makes it possible to reduce electrode wear resulting from heat of the arc, as compared to Patent Literature 1.

Moreover, even if, for example, the first electrode 1*a* and the second electrode 1*b* generate metal vapor because of the electrode wear, the pressure in the enclosed space 4 is further increased, which results in an increased amount of gas blown onto the arc 3 for contribution to an improvement in arc extinguishing performance.

The electrode housing, which houses the electrodes, uses the arc extinguishing member to release the ablation gas through the arc discharge light, thus promoting the cooling of the arc, increasing the pressure in the enclosed space, and imparting the capability to blow the gas onto the arc. The switching device according to the first embodiment can therefore improve the arc extinguishing performance.

Since the arc extinguishing performance is improved without a method dependent on a spiral electrode that serves as a magnetic arc drive mechanism, a decrease in arc extinguishing performance that might be caused by wear of the spiral electrode is prevented. Furthermore, the use of a spiral electrode prevents an increase in device size and complexity. With the simple structure, the device is smaller in size and lighter in weight.

Second Embodiment

In a second embodiment, the same reference characters are used for elements identical or similar to those in the first embodiment of the present disclosure, and descriptions of identical or corresponding parts are omitted. With reference to the drawings, a description is hereinafter provided of a switching device 200 according to the second embodiment.

Figure 4:
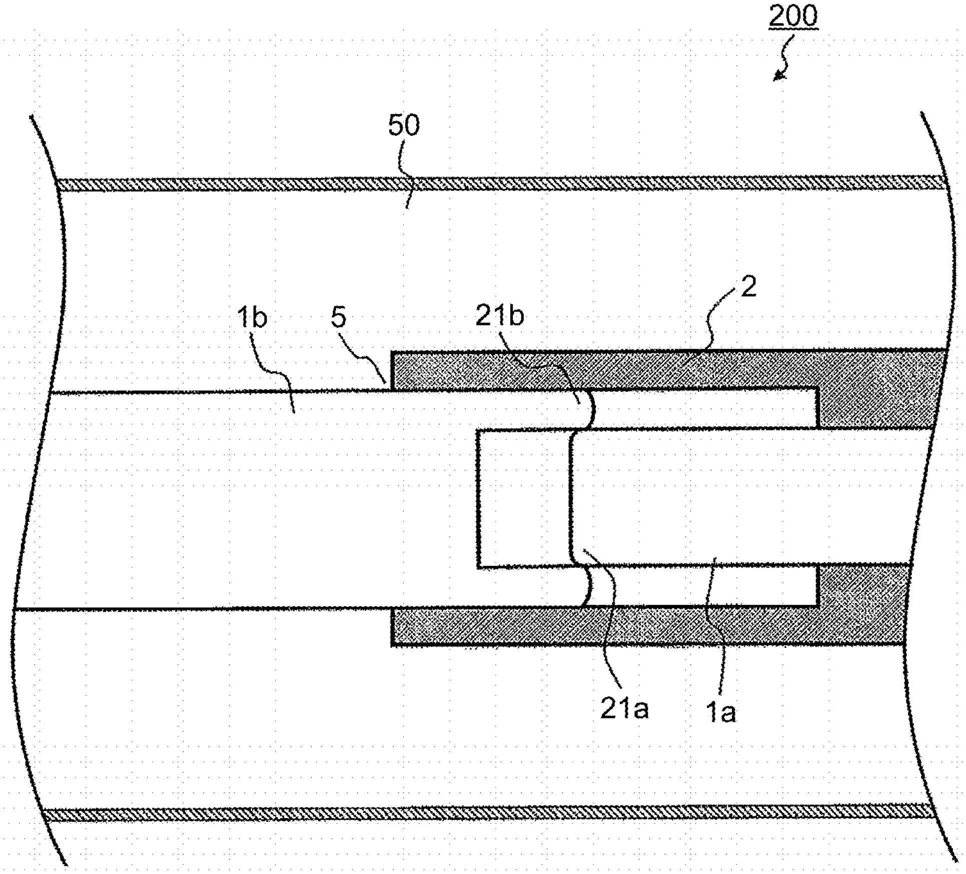
FIG. 4 is a schematic sectional view illustrating a closed state of a switching device according to a second embodiment just before electrode separation.
Figure 5:
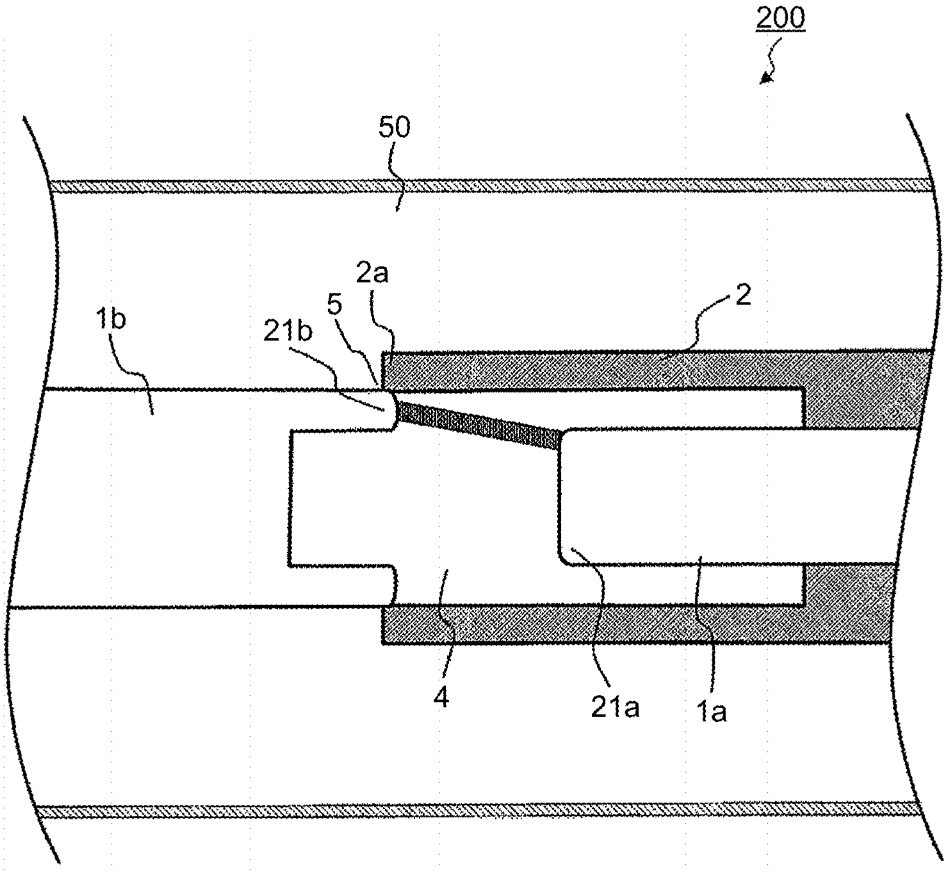
FIG. 5 is a schematic sectional view illustrating an open state of an internal space of the switching device according to the second embodiment.
Figure 6:
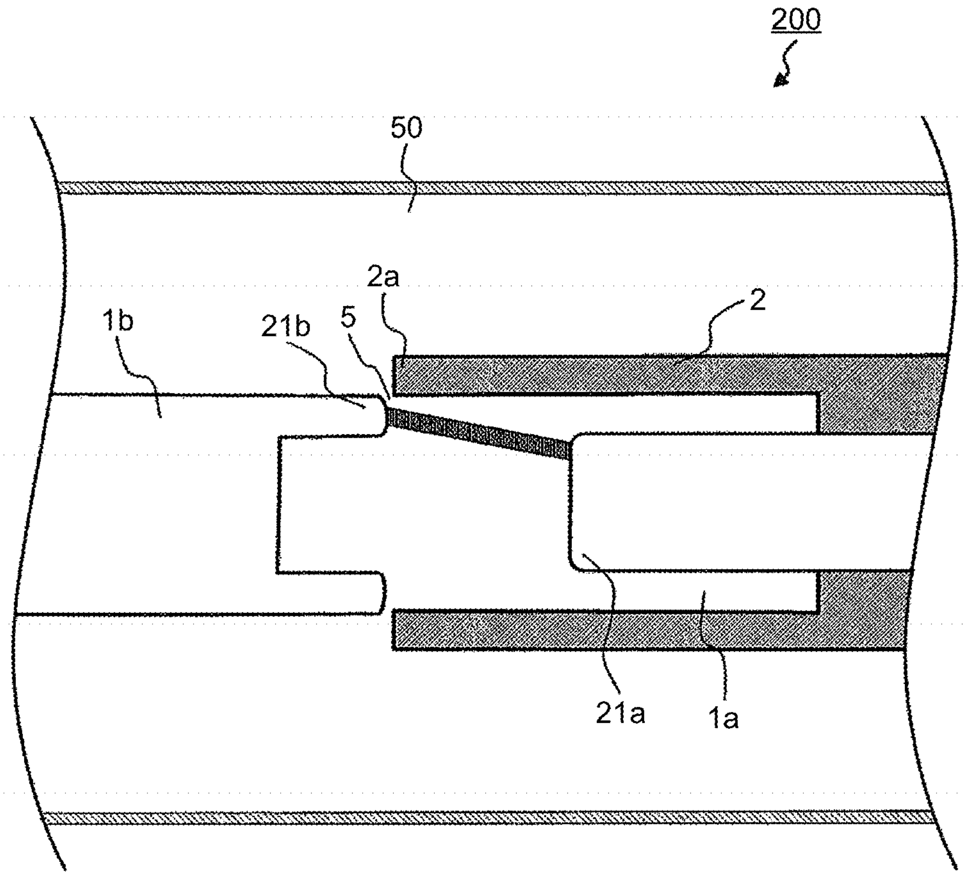
FIG. 6 is a schematic sectional view illustrating an open state of the switching device according to the second embodiment.

FIGS. 4, 5, and 6 each illustrate the switching device 200 according to the second embodiment in a closed state, a partially open state with an enclosed space during interruption, and an open state after an opening action advances out of the enclosed space. FIGS. 4 to 6 are schematic diagrams illustrating sections in a right-and-left direction of the drawing that is the direction of movement of a pair of electrodes into or out of contact with each other.

FIG. 4 is a schematic sectional view illustrating the closed state of the switching device 200 according to the second embodiment with the pair of electrodes in contact with each other just before the electrodes are separated from each other.

As illustrated in FIG. 4, the switching device 200 includes the electrode housing 2, the first electrode 1*a*, and the second electrode 1*b*, inside the tank 50 enclosing an insulating gas. The electrode housing 2 has the opening 5. The first electrode 1*a* is provided inside the electrode housing 2. The second electrode 1*b* fits in the opening 5 of the electrode housing 2 in an insertable and detachable manner such that the second electrode 1*b* comes into and out of contact with the first electrode 1*a* inside the electrode housing 2.

The pair of electrodes of the switching device 100 according to the first embodiment have the same diameter at their respective ends that face each other, whereas the pair of electrodes of the switching device 200 according to the second embodiment have different diameters at their respective ends that face each other.

As illustrated in FIG. 4, the first electrode 1*a* and the second electrode 1*b* have a first-electrode end 21*a* and a second-electrode end 21*b*, respectively, that are the ends facing each other.

When the switching device 200 transits from the closed state to the open state, the second electrode 1*b* moves in the direction opposite to the first electrode 1*a*. This direction refers to a leftward opening direction of the drawing. FIG. 4 illustrates the closed state with the second-electrode end 21*b* and the first-electrode end 21*a* in contact with each other just before the second electrode 1*b* and the first electrode 1*a* are separated from each other.

The second-electrode end 21*b* protrudes in a direction toward a space between the first-electrode end 21*a* and the electrode housing 2. The second-electrode end 21*b* has an inside diameter larger than an outside diameter of the first-electrode end 21*a* and an outside diameter smaller than an inside diameter of the electrode housing 2. In other words, the second-electrode end 21*b* has the inside and outside diameters that allow the second-electrode end 21*b* to extend between the first-electrode end 21*a* and the electrode housing 2. The second-electrode end 21*b* may have the shape of, for example, a cylinder that covers an entire periphery of the first-electrode end 21*a* or may be defined by one or more protrusions only partly covering the entire periphery of the first-electrode end 21*a*. For example, the second-electrode end 21*b* may be defined by two protrusions each covering the corresponding one of upper and lower portions of the first-electrode end 21*a* in FIG. 4.

In the closed state of the switching device 200 with the first and second electrodes 1*a* and 1*b* in contact with each other, the second-electrode end 21*b* extends between the first electrode 1*a* and the electrode housing 2 while the first-electrode end 21*a* of the first electrode 1*a* is inserted into the second-electrode end 21*b* of the second electrode 1*b*, such that the first electrode 1*a* and the second electrode 1*b* fit together.

FIG. 5 is a schematic sectional view illustrating the open state of the switching device 200 with a sealed space, i.e., the enclosed space 4 defined by the first electrode 1*a*, the second electrode 1*b*, and the electrode housing 2 as a result of the separation of the first and second electrodes 1*a* and 1*b* out of contact with each other.

The second electrode 1*b* is separated from the first electrode 1*a* by moving in the direction opposite to the first electrode 1*a*, namely, in the leftward opening direction of the drawing. At the same time as that separation, an arc 3 is struck between the electrodes. In other words, the arc 3 is generated between the first-electrode end 21*a* and the second-electrode end 21*b* in the enclosed space 4. The opening action of the first and second electrodes 1*a* and 1*b* progresses leaving the enclosed space 4 formed, such that the first electrode 1*a* and the second electrode 1*b* become separated from each other by a certain distance.

During the progression of the opening action, the electrode housing 2 is contacted by the arc 3 or irradiated with arc discharge light associated with discharge of the arc 3, thereby generating an ablation gas. A gas including the ablation gas and the insulating gas is retained in the enclosed space 4. This increasing ablation gas promotes cooling of the arc 3. Furthermore, the increasing ablation gas increases a pressure in the enclosed space 4 to a higher pressure.

The enclosed space 4 formed just before the second-electrode end 21*b* moves away from the opening 5 of the electrode housing end 2*a* has a maximum volume, with the second-electrode end 21*b* of the second electrode 1*b* in contact with the electrode housing end 2*a* of the electrode housing 2 as illustrated in FIG. 5. As illustrated in FIG. 5, the maximum volume of the enclosed space 4 in the switching device 200 includes a space external to the first electrode 1*a* and an internal space of the second-electrode end 21*b* and thus is large, as compared to that of the first embodiment. Furthermore, as compared to the first embodiment, the electrode housing 2 has an increased portion exposed to the arc, and thus generates an increased amount of ablation gas through the arc discharge light. In other words, both the gas amount and the gas retaining space increase, as compared to the first embodiment, thus leading to an enhanced cooling effect on the arc 3 and an increased amount of gas blown onto the arc 3.

FIG. 6 illustrates the open state of the switching device 200 with the first and second electrodes 1*a* and 1*b* further separated from each other. The open state advances by the further movement of the second electrode 1*b* in the direction opposite to the first electrode 1*a*. When a distance by which the first electrode 1*a* and the second electrode 1*b* are separated from each other exceeds the certain distance, the opening 5 appears between the second electrode 1*b* and the electrode housing end 2*a*, such that the enclosed space 4 opens through the opening 5 to a space external to the enclosed space 4. The enclosed space 4 is opened and thus becomes an opened space, whereupon the highly pressurized gas in the enclosed space 4 is instantly discharged outward through a gap defined between the opening 5 and the second electrode 1*b* moving away from the opening 5, such that a great amount of the gas serving as an arc quenching means that extinguishes the arc 3 is blown onto the arc 3. With this arc quenching means, the arc 3 is extinguished.

Figure 7:
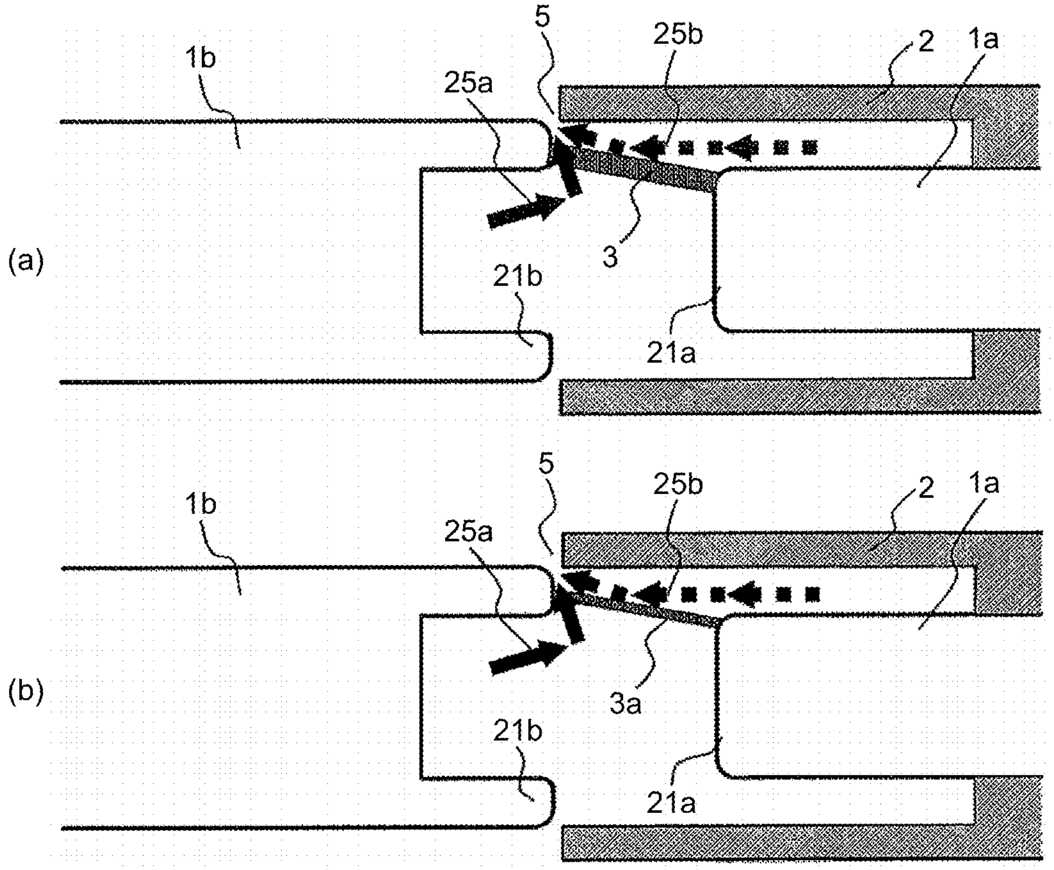
FIG. 7 is an explanatory diagram illustrating how gas is blown onto an arc upon the movement of an electrode of the switching device according to the second embodiment out of the internal space.

FIG. 7 is an explanatory diagram illustrating how the gas is blown onto the arc 3 upon the movement of the second electrode 1*b*, as illustrated in FIG. 6, out of the enclosed space 4. While FIG. 7(*a*) illustrates an initial state of the generated arc 3, FIG. 7(*b*) illustrates a state of an arc 3*a* having the gas blown thereonto.

As illustrated in FIGS. 7(*a*) and 7(*b*), the enclosed space 4 becomes the opened space, whereupon the gas flows out through the gap defined between the opening 5 and the second electrode 1*b* in a first gas flow direction 25*a* indicated by solid-line arrows and a second gas flow direction 25*b* indicated by dotted-line arrows. The first gas flow direction 25*a* refers to a direction in which the gas flows out from the internal space of the second-electrode end 21*b* toward the gap defined between the opening 5 and the second-electrode end 21*b*. The second gas flow direction 25*b* refers to a direction in which the gas flows out from space between the electrode housing 2 and the first electrode 1*a* toward the gap defined between the opening 5 and the second-electrode end 21*b*.

The gas, which flows along two paths in the first and second gas flow directions 25*a* and 25*b*, is blown onto the arc 3, thereby turning the arc 3 into the smaller-diameter arc 3*a* as illustrated in FIG. 7(*b*). As the arc diameter is narrowed, arc resistance increases, leading to easier interruption and improvement of arc extinguishing performance.

The switching device according to the second embodiment has the same effects as that of the first embodiment.

Furthermore, since the amount of ablation gas generated from the electrode housing 2 and the gas retaining space increase, as compared to the first embodiment, the cooling effect on the arc 3 is enhanced, and the increased amount of gas is blown onto the arc 3. Moreover, the gas flowing along the two paths is blown onto the arc 3, thereby further enhancing the arc extinguishing performance.

Third Embodiment

In a third embodiment, the same reference characters are used for elements identical or similar to those in the first embodiment of the present disclosure, and descriptions of identical or corresponding parts are omitted. With reference to the drawings, a description is hereinafter provided of a switching device 300 according to the third embodiment.

Figure 8:
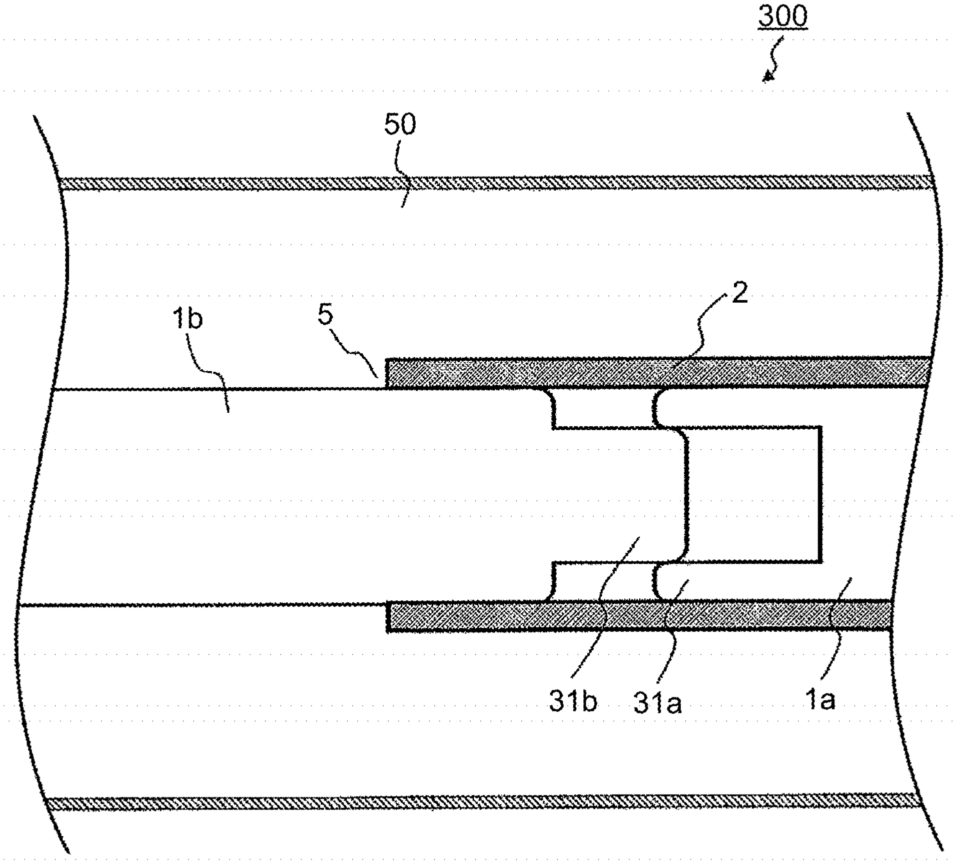
FIG. 8 is a schematic sectional view illustrating a closed state of a switching device according to a third embodiment just before electrode separation.
Figure 9:
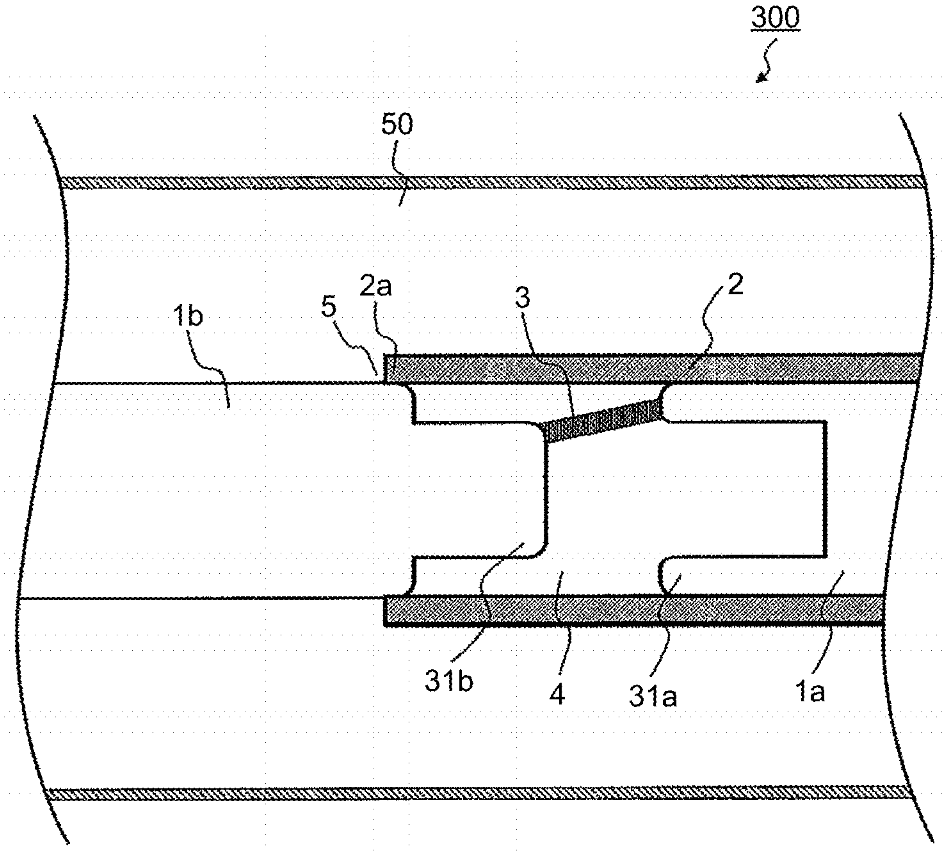
FIG. 9 is a schematic sectional view illustrating an open state of an internal space of the switching device according to the third embodiment.
Figure 10:
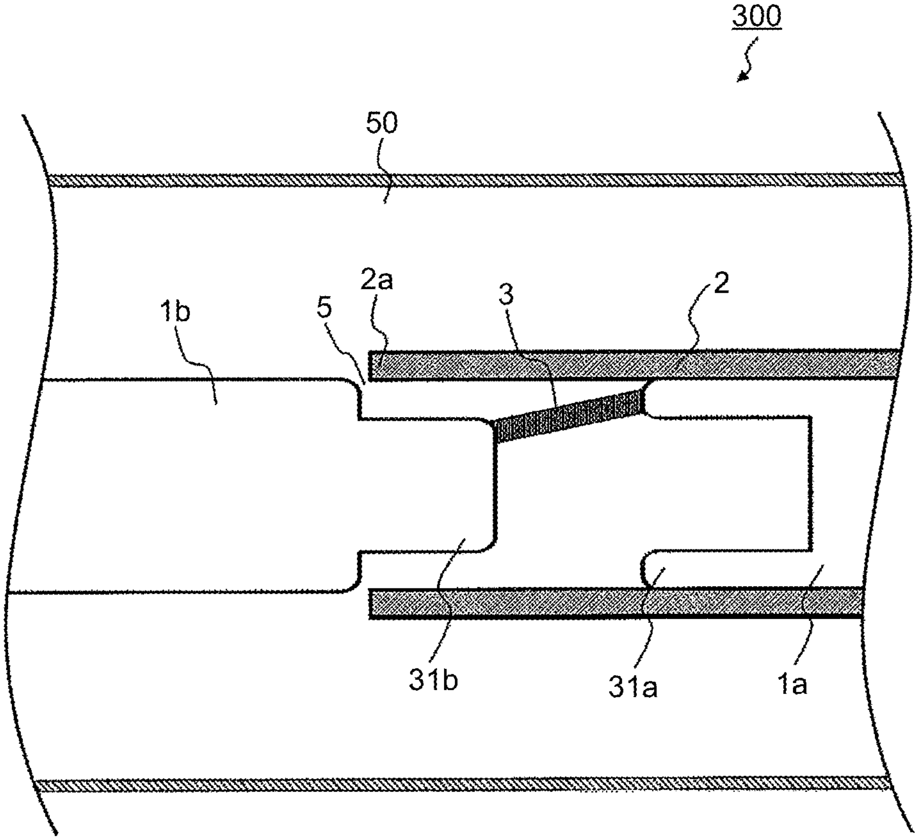
FIG. 10 is a schematic sectional view illustrating an open state of the switching device according to the third embodiment.

FIGS. 8, 9, and 10 each illustrate the switching device 300 according to the third embodiment in a closed state, a partially open state with an enclosed space during interruption, and an open state after an opening action advances out of the enclosed space. FIGS. 8 to 10 are schematic diagrams illustrating sections in a right-and-left direction of the drawing that is the direction of movement of a pair of electrodes into or out of contact with each other.

FIG. 8 is a schematic sectional view illustrating the closed state of the switching device 300 according to the third embodiment with the pair of electrodes in contact with each other just before the electrodes are separated from each other.

As illustrated in FIG. 8, the switching device 300 includes the electrode housing 2, the first electrode 1*a*, and the second electrode 1*b*, inside the tank 50 enclosing an insulating gas. The electrode housing 2 has the opening 5. The first electrode 1*a* is provided inside the electrode housing 2. The second electrode 1*b* fits in the opening 5 of the electrode housing 2 in an insertable and detachable manner such that the second electrode 1*b* comes into and out of contact with the first electrode 1*a* inside the electrode housing 2.

As in the second embodiment, the pair of electrodes of the switching device 300 according to the third embodiment have different diameters at their respective ends facing each other.

As illustrated in FIG. 8, the first electrode 1*a* and the second electrode 1*b* have a first-electrode end 31*a* and a second-electrode end 31*b*, respectively, that are the ends facing each other.

When the switching device 300 transits from the closed state to the open state, the second electrode 1*b* moves in the direction opposite to the first electrode 1*a*. This direction refers to a leftward opening direction of the drawing. FIG. 8 illustrates the closed state with the second-electrode end 31*b* and the first-electrode end 31*a* in contact with each other just before the second electrode 1*b* and the first electrode 1*a* are separated from each other.

The first-electrode end 31*a* protrudes in a direction toward a space between the second-electrode end 31*b* and the electrode housing 2. The first-electrode end 31*a* has an inside diameter larger than an outside diameter of the second-electrode end 31*b* and an outside diameter smaller than an inside diameter of the electrode housing 2. In other words, the first-electrode end 31*a* has the inside and outside diameters that allow the first-electrode end 31*a* to extend between the second-electrode end 31*b* and the electrode housing 2. The first-electrode end 31*a* may have the shape of, for example, a cylinder that covers an entire periphery of the second-electrode end 31*b* or may be defined by one or more protrusions only partly covering the entire periphery of the second-electrode end 31*b*. For example, the first-electrode end 31*a* may be defined by two protrusions each covering the corresponding one of upper and lower portions of the second-electrode end 31*b* in FIG. 8. The second-electrode end 31*b* is small in outside diameter, as compared with a portion of the second electrode 1*b* that fits in the opening 5 of the electrode housing 2.

In the closed state of the switching device 300 with the first and second electrodes 1*a* and 1*b* in contact with each other, the first-electrode end 31*a* extends between the second-electrode end 31*b* and the electrode housing 2 while the second-electrode end 31*b* is inserted inside the first-electrode end 31*a*, such that the first electrode 1*a* and the second electrode 1*b* fit together.

FIG. 9 is a schematic sectional view illustrating the open state of the switching device 300 with a sealed space, i.e., the enclosed space 4 defined by the first electrode 1*a*, the second electrode 1*b*, and the electrode housing 2 as a result of the separation of the first and second electrodes 1*a* and 1*b* out of contact with each other.

The second electrode 1*b* is separated from the first electrode 1*a* by moving in the direction opposite to the first electrode 1*a*, namely in the leftward opening direction of the drawing. At the same time as that separation, an arc 3 is struck between the electrodes. In other words, the arc 3 is generated between the first-electrode end 31*a* and the second-electrode end 31*b* in the enclosed space 4. The opening action of the first and second electrodes 1*a* and 1*b* progresses leaving the enclosed space 4 formed, such that the first electrode 1*a* and the second electrode 1*b* become separated from each other by a certain distance.

During the progression of the opening action, the electrode housing 2 is contacted by the arc 3 or irradiated with arc discharge light associated with discharge of the arc 3, thereby generating an ablation gas. A gas including the ablation gas and the insulating gas is retained in the enclosed space 4. This increasing ablation gas promotes cooling of the arc 3. Furthermore, the increasing ablation gas increases a pressure in the enclosed space 4 to a higher pressure.

The enclosed space 4 formed just before the second electrode 1*b* moves away from the opening 5 of the electrode housing end 2*a* has a maximum volume, with the second electrode 1*b* in contact with the electrode housing end 2*a* of the electrode housing 2 as illustrated in FIG. 9. As illustrated in FIG. 9, the maximum volume of the enclosed space 4 in the switching device 300 includes an internal space of the first-electrode end 31*a* and a space external to the second-electrode end 31*b* and thus is large compared to that of the first embodiment. Furthermore, compared to the first embodiment, the electrode housing 2 has an increased portion exposed to the arc, and thus increases ablation gas through the arc discharge light. In other words, both the gas amount and the gas retaining space increase, as compared to the first embodiment, thus leading to an enhanced cooling effect on the arc 3 and an increased amount of gas blown onto the arc 3.

FIG. 10 illustrates the open state of the switching device 300 with the first and second electrodes 1*a* and 1*b* further separated from each other. The open state advances by the further movement of the second electrode 1*b* in the direction opposite to the first electrode 1*a*. When a distance by which the first electrode 1*a* and the second electrode 1*b* are separated from each other exceeds the certain distance, the opening 5 appears between the second electrode 1*b* and the electrode housing end 2*a*, such that the enclosed space 4 opens through the opening 5 to a space external to the enclosed space 4. The enclosed space 4 is opened and thus becomes into an opened space, whereupon the highly pressurized gas in the enclosed space 4 is instantly discharged outward through a gap defined between the opening 5 and the second electrode 1*b* moving away from the opening 5, such that a great amount of the gas serving as an arc quenching means that extinguishes the arc 3 is blown onto the arc 3. With this arc quenching means, the arc 3 is extinguished.

Figure 11:
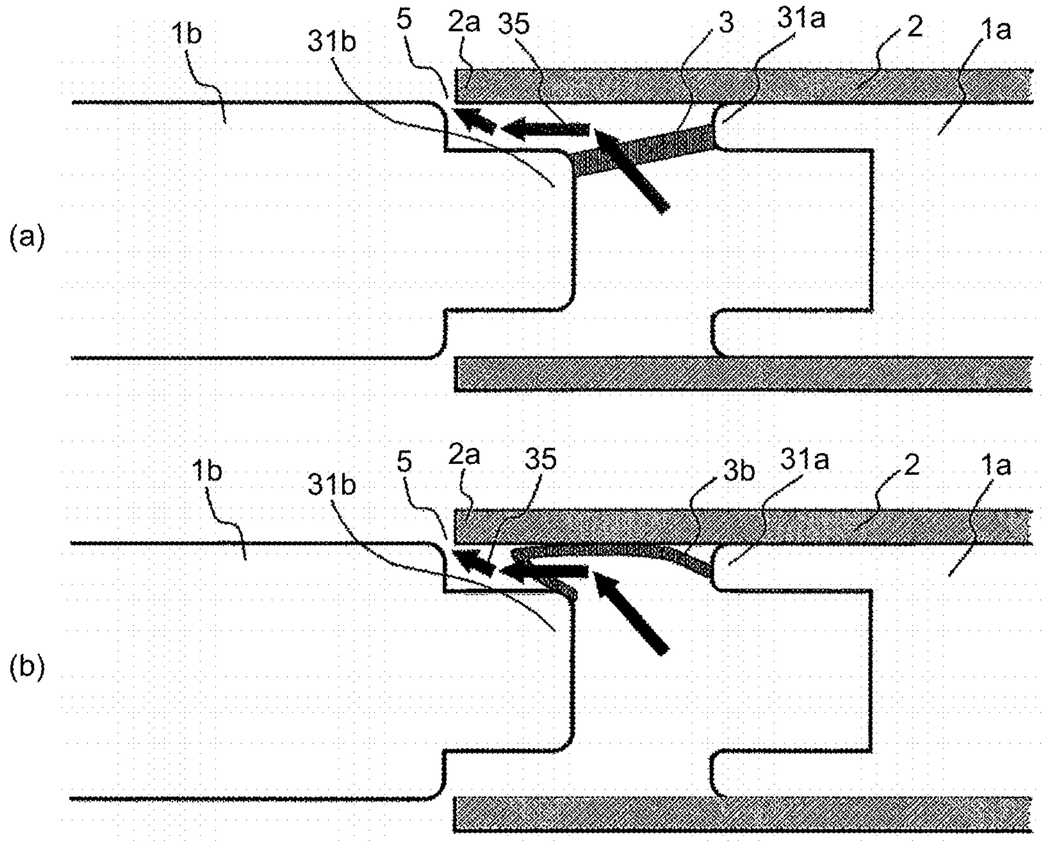
FIG. 11 is an explanatory diagram illustrating how gas is blown onto an arc upon the movement of an electrode of the switching device according to the third embodiment out of the internal space.

FIG. 11 is an explanatory diagram illustrating how the gas is blown onto the arc 3 upon the movement of the second electrode 1*b*, as illustrated in FIG. 10, out of the enclosed space 4. While FIG. 11(*a*) illustrates an initial state of the generated arc 3, FIG. 11(*b*) illustrates a state of an arc 3*b* having the gas blown thereonto.

As illustrated in FIGS. 11(*a*) and 11(*b*), the enclosed space 4 becomes the opened space, whereupon the gas flows out through the gap defined between the opening 5 and the second electrode 1*b* in a gas flow direction 35 indicated by solid-line arrows. The gas flow direction 35 refers to a direction in which the gas flows out from space between the first-electrode end 31*a* and the second-electrode end 31*b* toward the gap defined between the opening 5 and the second electrode 1*b*.

The gas flow direction 35 is orthogonal to the arc 3, thus turning the art 3 in the state illustrated in FIG. 11(*a*) into the arc 3*b* of FIG. 11(*b*) stretching toward the electrode housing 2. As the arc 3*b* increases in length, arc resistance increases, leading to easier interruption and improvement of arc extinguishing performance.

The switching device according to the third embodiment has the same effects as that of the second embodiment.

Fourth Embodiment

In a fourth embodiment, the same reference characters are used for elements identical or similar to those in the first embodiment of the present disclosure, and descriptions of identical or corresponding parts are omitted. With reference to the drawing, a description is hereinafter provided of a switching device according to the fourth embodiment.

Figure 12:
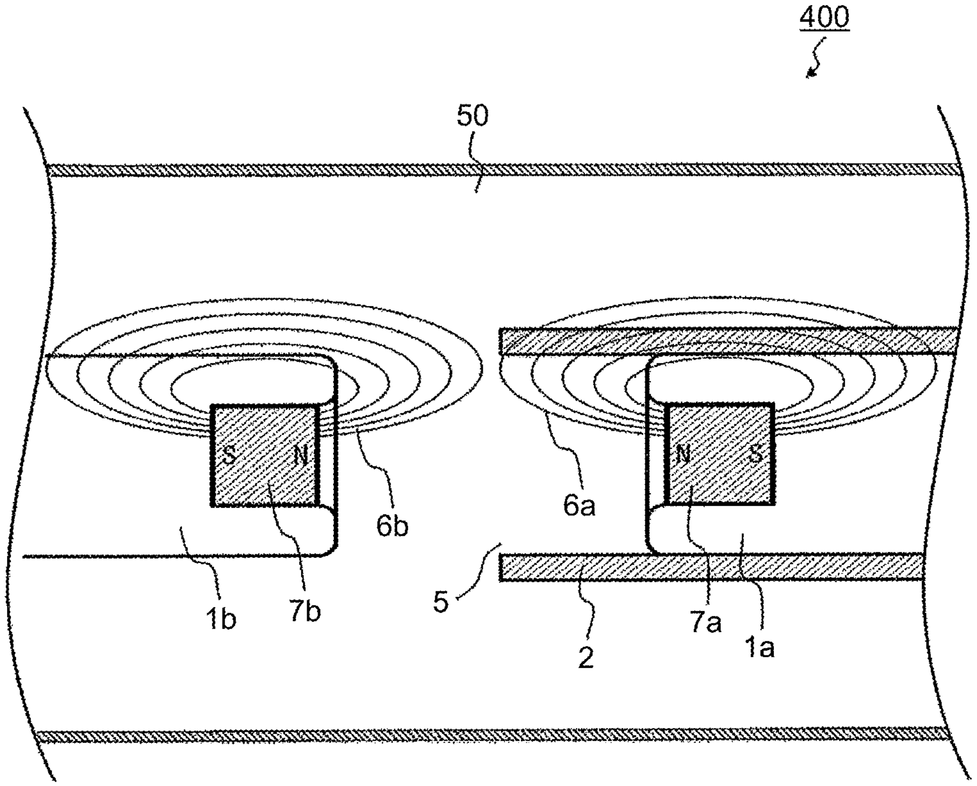
FIG. 12 is a schematic sectional view illustrating an open space in a switching device according to a fourth embodiment.

FIG. 12 is a schematic diagram of a switching device 400 according to the fourth embodiment in an open state, illustrating a section in a right-and-left direction of the drawing that is the direction of movement of a pair of electrodes of the switching device 400 into or out of contact with each other. FIG. 12 illustrates the fully opened and insulated state of the switching device 400.

As illustrated in FIG. 12, the switching device 400 includes the first and second electrodes 1*a* and 1*b* and the electrode housing 2, inside the tank 50 enclosing an insulating gas. The first and second electrodes 1*a* and 1*b*, which are the pair of electrodes that disposed facing each other, come into or out of contact with each other by moving toward or away from each other. The electrode housing 2 is disposed to cover the first and second electrodes 1*a* and 1*b*.

As compared with the electrodes of the switching device 100 according to the first embodiment, the electrodes of the switching device 400 according to the fourth embodiment each internally include a magnetic field generation part as a source that generates a magnetic field including a component in a direction orthogonal to an arc.

As illustrated in FIG. 12, permanent magnets are used as the magnetic field generation parts. Specifically, the permanent magnets include a first permanent magnet 7*a* and a second permanent magnet 7*b* that are disposed inside the first electrode 1*a* and the second electrode 1*b*, respectively. The first permanent magnet 7*a* and the second permanent magnet 7*b* generate a first magnetic field 6*a* and a second magnetic field 6*b*, respectively, that include the components in the direction orthogonal to the arc.

The first and second permanent magnets 7*a* and 7*b* may be disposed in other manners than illustrated, provided that polarities of the permanent magnets 7*a* and 7*b* are oriented to provide repulsions. For example, the first permanent magnet 7*a* and the second permanent magnet 7*b* may be disposed outside the first electrode 1*a* and the second electrode 1*b*, respectively. Alternatively, the first permanent magnet 7*a* and the second permanent magnet 7*b* may be set at electric field limiting members disposed outside the electrode housing 2. Still another example is where only one of the first and second electrodes 1*a* and 1*b* may be provided with the magnetic field generation part that generates the magnetic field having the component in the direction orthogonal to the arc. For example, even placing only one of the first and second permanent magnets 7*a* and 7*b* illustrated in FIG. 12 provides the same effect.

In the fourth embodiment as well, when the first and second electrodes 1*a* and 1*b* are separated from each other, the arc is generated between the first electrode 1*a* and the second electrode 1*b* in an enclosed space defined by the first electrode 1*a*, the second electrode 1*b*, and the electrode housing 2.

In this case, Lorentz forces generated by the first and second magnetic fields 6*a* and 6*b*, which include the components in the direction orthogonal to the arc generated between the first and second electrodes 1*a* and 1*b*, magnetically drives and cools the arc, thus improving arc extinguishing performance. Furthermore, by being magnetically driven, the arc rotates into contact with the electrode housing 2, thus leading to an increased amount of ablation gas generated and an increased pressure in the enclosed space. An increased amount of gas is blown onto the arc, thus enabling the arc extinguishing performance to be enhanced.

Moreover, since the arc rotates by being magnetically driven, the surface temperature of the electrodes is reduced and, an arc duration is shortened because of the improved arc extinguishing performance. This results in the prevention of electrode wear.

The switching device according to the fourth embodiment has the same effects as that of the first embodiment.

Furthermore, the use of the permanent magnets that generate the magnetic fields having the components in the direction orthogonal to the arc makes it possible to magnetically drive the arc, thereby further improving arc extinguishing performance.

Fifth Embodiment

In a fifth embodiment, the same reference characters are used for elements identical or similar to those in the first embodiment of the present disclosure, and descriptions of identical or corresponding parts are omitted. With reference to the drawing, a description is hereinafter provided of a switching device according to the fifth embodiment.

Figure 13:
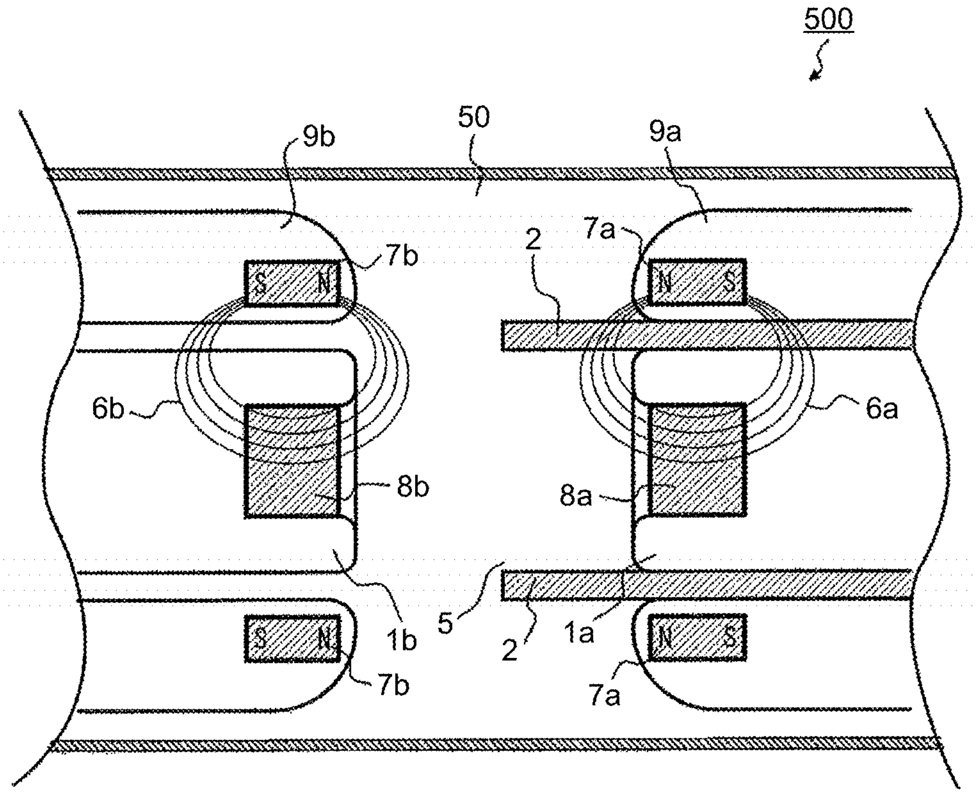
FIG. 13 is a schematic sectional view illustrating an open space in a switching device according to a fifth embodiment.

FIG. 13 is a schematic diagram of a switching device 500 according to the fifth embodiment in an open state, illustrating a section in a right-and-left direction of the drawing that is the direction of movement of a pair of electrodes of the switching device 500 into or out of contact with each other. FIG. 13 illustrates the fully opened and insulated state of the switching device 500.

As illustrated in FIG. 13, the switching device 500 includes the first and second electrodes 1*a* and 1*b* and the electrode housing 2, inside the tank 50 enclosing an insulating gas. The first and second electrodes 1*a* and 1*b*, which are the pair of electrodes disposed facing each other, come into or out of contact with each other, by moving toward or away from each other. The electrode housing 2 is disposed to cover the first and second electrodes 1*a* and 1*b*.

As in the fourth embodiment, the switching device 500 according to the fifth embodiment generates magnetic fields having components in a direction orthogonal to an arc are.

In the fourth embodiment, the magnetic field having the component in the direction orthogonal to the arc is generated by the permanent magnet provided inside or outside the electrode. However, in the switching device 500 according to the fifth embodiment, magnetic field generation parts as sources that generates the magnetic fields each use a magnetic body provided inside the electrode and a permanent magnet provided outside either the electrode or the electrode housing for generating the magnetic field having the component in the direction orthogonal to the arc.

As illustrated in FIG. 13, one set of the magnetic field generation parts is a combination of the first magnetic body 8*a* disposed inside the first electrode 1*a* and the first permanent magnet 7*a* disposed outside the first electrode 1*a*. The other set of the magnetic field generation parts is a combination of the second magnetic body 8*b* disposed inside the second electrode 1*b* and the second permanent magnet 7*b* disposed outside the second electrode 1*b*. The first permanent magnet 7*a* is attached to a first electric field limiting member 9*a* disposed outside the first electrode 1*a*. The second permanent magnet 7*b* is attached to a second electric field limiting member 9*b* disposed outside the second electrode 1*b*.

The first and second electric field limiting members 9*a* and 9*b*, which define electric field limiting members, have an effect of preventing electric field concentration in areas other than the electrodes. Such electric field limiting members are typically attached to disconnectors, grounding switches, etc. In FIG. 13, the second electric field limiting member 9*b* is disposed outside the electrode housing 2 that covers the first electrode 1*a*.

The combination of the first magnetic body 8*a* and the first permanent magnet 7*a* generates the first magnetic field 6*a* having the component in the direction orthogonal to the arc. The combination of the second magnetic body 8*b* and the second permanent magnet 7*b* generates the second magnetic field 6*b* having the component in the direction orthogonal to the arc.

With the combination of the first magnetic body 8*a* and the first permanent magnet 7*a*, the first magnetic field 6*a* has increased strength in the direction orthogonal to the arc. With the combination of the second magnetic body 8*b* and the second permanent magnet 7*b*, the second magnetic field 6*b* has increased strength in the direction orthogonal to the arc.

The switching device 500 even with only one combination, namely, either the combination of the first magnetic body 8*a* and the first permanent magnet 7*a* or the combination of the second magnetic body 8*b* and the second permanent magnet 7*b*, provides the same effect.

FIG. 13 illustrates the magnetic field generation part by way of example. Any magnetic field generation part that can generate the magnetic field having the component in the direction orthogonal to the arc may use, for example, a combination of a permanent magnet provided inside the electrode and a magnetic body provided in the electric field limiting member disposed outside the electrode or a combination of a permanent magnet provided inside the electrode and a permanent magnet provided in the electric field limiting member disposed outside the electrode.

The switching device according to the fifth embodiment has the same effects as that of the fourth embodiment. Furthermore, as compared to the fourth embodiment, the combination of the magnetic body and the permanent magnet increases the strength of the magnetic field in the direction orthogonal to the arc, thereby making it possible to further improve arc extinguishing performance.

Sixth Embodiment

In a sixth embodiment, the same reference characters are used for elements identical or similar to those in the first embodiment of the present disclosure, and descriptions of identical or corresponding parts are omitted. With reference to the drawing, a description is hereinafter provided of a switching device according to the sixth embodiment.

Figure 14:
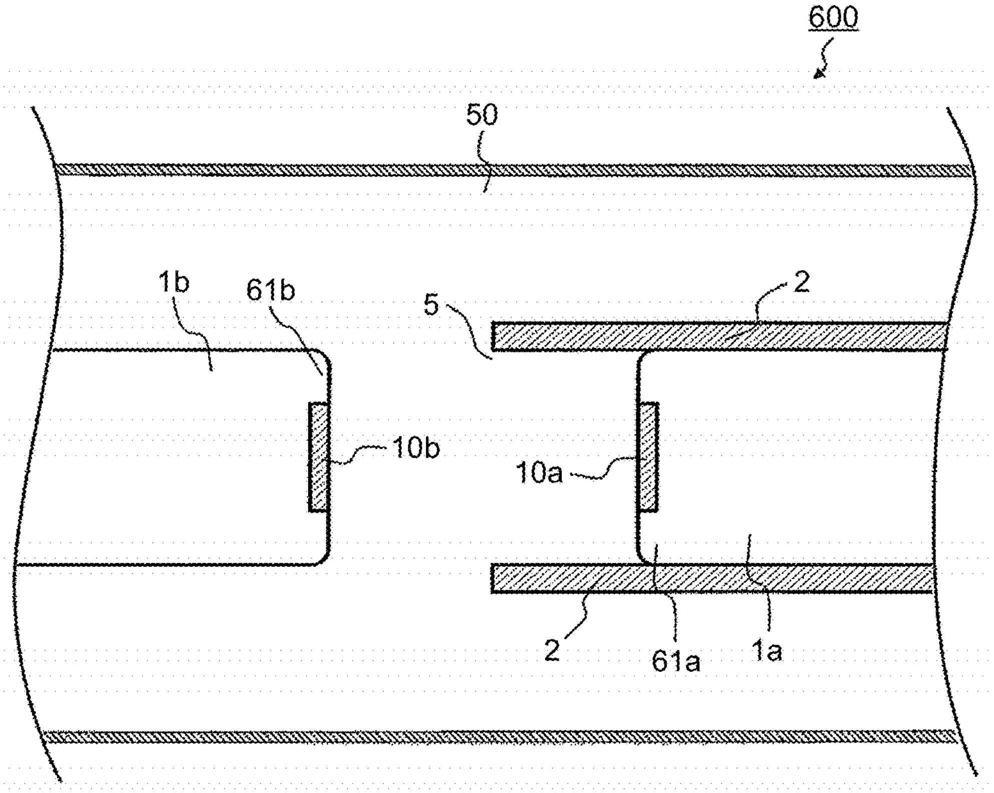
FIG. 14 is a schematic sectional view illustrating an open space in a switching device according to a sixth embodiment.

FIG. 14 is a schematic diagram of a switching device 600 according to the sixth embodiment in an open state, illustrating a section in a right-and-left direction of the drawing that is the direction of movement of a pair of electrodes of the switching device 600 into or out of contact with each other. FIG. 14 illustrates the fully opened and insulated state of the switching device 600.

As illustrated in FIG. 14, the switching device 600 includes the first and second electrodes 1*a* and 1*b* and the electrode housing 2, inside the tank 50 enclosing an insulating gas. The first and second electrodes 1*a* and 1*b*, which are the pair of electrodes disposed facing each other, come into or out of contact with each other by moving toward or away from each other. The electrode housing 2 is disposed to cover the first and second electrodes 1*a* and 1*b*.

As compared with the electrodes of the switching device 100 according to the first embodiment, the electrodes of the switching device 600 according to the sixth embodiment are provided with arc extinguishing members that generate an ablation gas through arc discharge light.

As illustrated in FIG. 14, the first electrode 1*a* and the second electrode 1*b* have a first-electrode end 61*a* and a second-electrode end 61*b*, respectively, that face each other.

A first arc extinguishing member 10*a* is attached as the arc extinguishing member to a surface of the first-electrode end 61*a*. A second arc extinguishing member 10*b* is attached as the arc extinguishing member to a surface of the second-electrode end 61*b*. The first and second arc extinguishing members 10*a* and 10*b* can be the same arc extinguishing member as used in the electrode housing 2 to generate the ablation gas.

In the switching device 600 according to the sixth embodiment as well, the first and second electrodes 1*a* and 1*b* and the electrode housing 2 define an enclosed or sealed space therebetween when the first and second electrodes 1*a* and 1*b*, which contacted each other in closed positions, become separated from each other by a certain distance.

When the first and second electrodes 1*a* and 1*b* are separated from each other, an arc is generated between the first electrode 1*a* and the second electrode 1*b* in the enclosed space defined by the first electrode 1*a*, the second electrode 1*b*, and the electrode housing 2, and the ablation gas is generated from the electrode housing 2 through the arc discharge light. Furthermore, by being contacted by the arc or irradiated with the arc discharge light, the first and second arc extinguishing members 10*a* and 10*b* generate the ablation gas.

In the enclosed space defined by the first electrode 1*a*, the second electrode 1*b*, and the electrode housing 2, not only the arc extinguishing member of the electrode housing 2 but also the arc extinguishing members of the electrodes generate the ablation gas, thus leading to an increased amount of ablation gas generated and a further increased pressure in the enclosed space. As a result, the arc can be cooled with improved efficiency, and a gas can be blown onto the arc with improved efficiency.

Even attaching only one of the first and second arc extinguishing members 10*a* and 10*b* to the corresponding electrode end surface similarly enables generation of an increased amount of ablation gas.

While FIG. 14 illustrates the arc extinguishing members provided on the surfaces of the electrode ends that are to contact each other, the arc extinguishing members can be set in any location that allows the arc extinguishing members to generate ablation gas through arc discharge light in the enclosed space.

The switching device according to the sixth embodiment has the same effects as that of the first embodiment.

Furthermore, since the arc extinguishing members provided at the electrodes generates the generation of the ablation gas as well through the arc discharge light, it become possible to cool the arc with improved efficiency and blow the gas onto the arc with improved efficiency, thereby further improving arc extinguishing performance, as compared to the first embodiment.

Seventh Embodiment

In a seventh embodiment, the same reference characters are used for elements identical or similar to those in the first embodiment of the present disclosure, and descriptions of identical or corresponding parts are omitted. With reference to the drawing, a description is hereinafter provided of a switching device according to the seventh embodiment.

Figure 15:
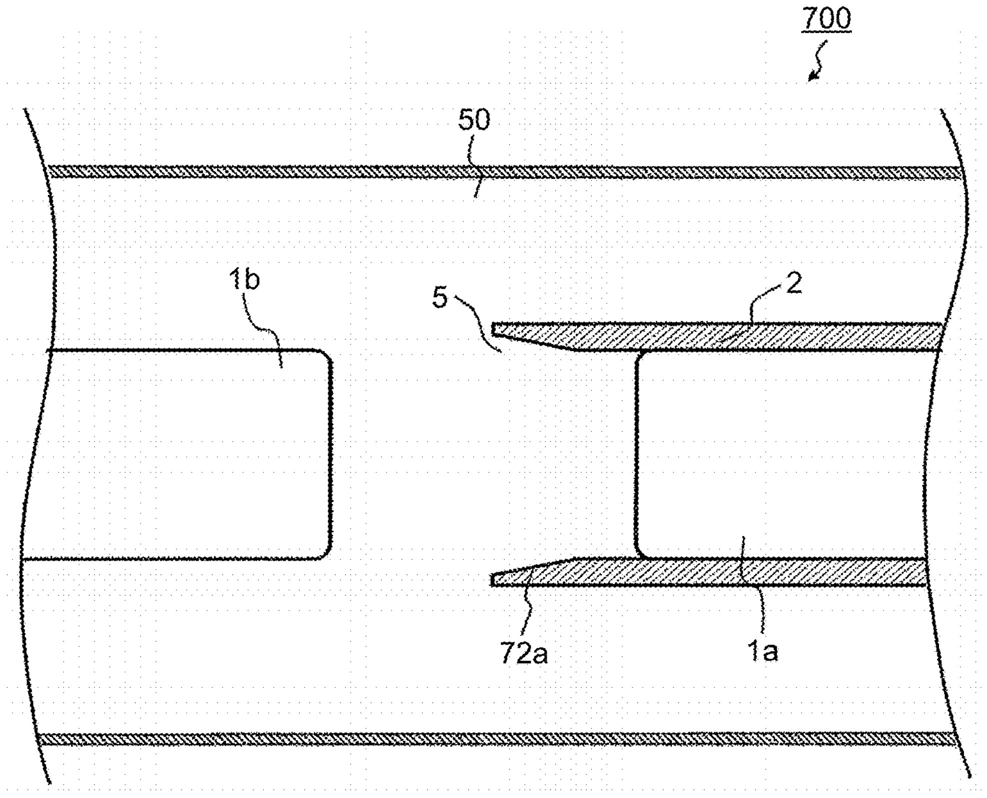
FIG. 15 is a schematic sectional view illustrating an open space in a switching device according to a seventh embodiment.

FIG. 15 is a schematic diagram of a switching device 700 according to the seventh embodiment in an open state, illustrating a section in a right-and-left direction of the drawing that is the direction of movement of a pair of electrodes of the switching device 700 into or out of contact with each other. FIG. 15 illustrates the fully opened and insulated state of the switching device 700.

As illustrated in FIG. 15, the switching device 700 includes the electrode housing 2, the first electrode 1*a*, and the second electrode 1*b*, inside the tank 50 enclosing an insulating gas. The electrode housing 2 has the opening 5. The first electrode 1*a* is provided inside the electrode housing 2. The second electrode 1*b* fits in the opening 5 of the electrode housing 2 in an insertable and detachable manner such that the second electrode 1*b* comes into and out of contact with the first electrode 1*a* inside the electrode housing 2.

As compared with the electrode housing of the switching device 100 according to the first embodiment, the electrode housing of the switching device 700 according to the seventh embodiment has an inside-diameter surface of a different shape.

The second electrode 1*b* moves in the left-right direction of the drawing in such a manner as to come into or out of contact with the first electrode 1*a*. The electrode housing 2 has an electrode housing end 72*a* in a leftward opening direction of the drawing in which the second electrode is separated from the first electrode. The electrode housing end 72*a* is an end on a side of the opening 5. As illustrated in FIG. 15, the electrode housing end 72*a* tapers to form an inclined inside-diameter surface.

When the first and second electrodes 1*a* and 1*b* are separated from each other, an arc is generated between the first electrode 1*a* and the second electrode 1*b* in an enclosed space defined by the first electrode 1*a*, the second electrode 1*b*, and the electrode housing 2, and an ablation gas is generated from the electrode housing 2 through arc discharge light. The first and second electrodes 1*a* and 1*b* are further separated from each other and allow the enclosed space to open to a space external to the enclosed space, whereupon a gas including the ablation gas retained in the enclosed space is blown onto the arc.

Since the inside-diameter surface of the electrode housing end 72*a* is inclined, the gas blown onto the arc is discharged along the inclined inside-diameter surface of the electrode housing end 72*a*, thus increasing a gas velocity.

The switching device according to the seventh embodiment has the same effects as that of the first embodiment.

Furthermore, the inclined inside-diameter surface of the electrode housing increases the velocity of the gas to be blown onto the arc, as compared to the first embodiment, thereby further improving arc extinguishing performance.

Eighth Embodiment

In an eighth embodiment, the same reference characters are used for elements identical or similar to those in the first embodiment of the present disclosure, and descriptions of identical or corresponding parts are omitted. With reference to the drawing, a description is hereinafter provided of a switching device according to the eighth embodiment.

Figure 16:
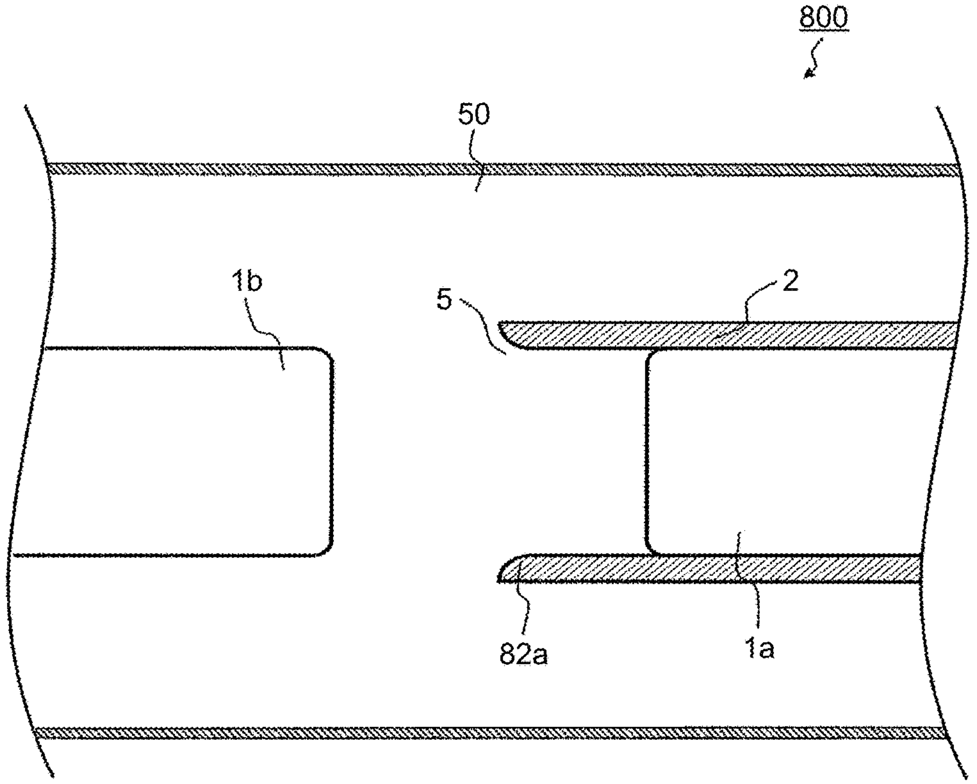
FIG. 16 is a schematic sectional view illustrating an open space in a switching device according to an eighth embodiment.

FIG. 16 is a schematic diagram of a switching device 800 according to the eighth embodiment in an open state, illustrating a section in a right-and-left direction of the drawing that is the direction of movement of a pair of electrodes of the switching device 800 into or out of contact with each other. FIG. 16 illustrates the fully opened and insulated state of the switching device 800.

As illustrated in FIG. 16, the switching device 800 includes the electrode housing 2, the first electrode 1*a*, and the second electrode 1*b*, inside the tank 50 enclosing an insulating gas. The electrode housing 2 has the opening 5. The first electrode 1*a* is provided inside the electrode housing 2. The second electrode 1*b* fits in the opening 5 of the electrode housing 2 in an insertable and detachable manner such that the second electrode 1*b* comes into and out of contact with the first electrode 1*a* inside the electrode housing 2.

As compared with the electrode housing of the switching device 100 according to the first embodiment, the electrode housing of the switching device 800 according to the eighth embodiment has an inside-diameter surface of a different shape, as in the seventh embodiment.

While the end of the electrode housing in the seventh embodiment has the inclined inside-diameter surface, the electrode housing 2 in the eighth embodiment as illustrated in FIG. 16 includes an electrode housing end 82*a* having a curved or round inside-diameter surface. The electrode housing end 82*a* is an end on the side of the opening 5.

Since the inside-diameter surface of the electrode housing end 82*a* is round, a gas blown onto an arc is discharged along the round inside-diameter surface of the electrode housing end 82*a*, thus increasing a gas velocity.

The switching device according to the eighth embodiment has the same effects as that of the seventh embodiment.

Ninth Embodiment

In a ninth embodiment, the same reference characters are used for elements identical or similar to those in the first embodiment of the present disclosure, and descriptions of identical or corresponding parts are omitted. With reference to the drawing, a description is hereinafter provided of a switching device according to the ninth embodiment.

Figure 17:
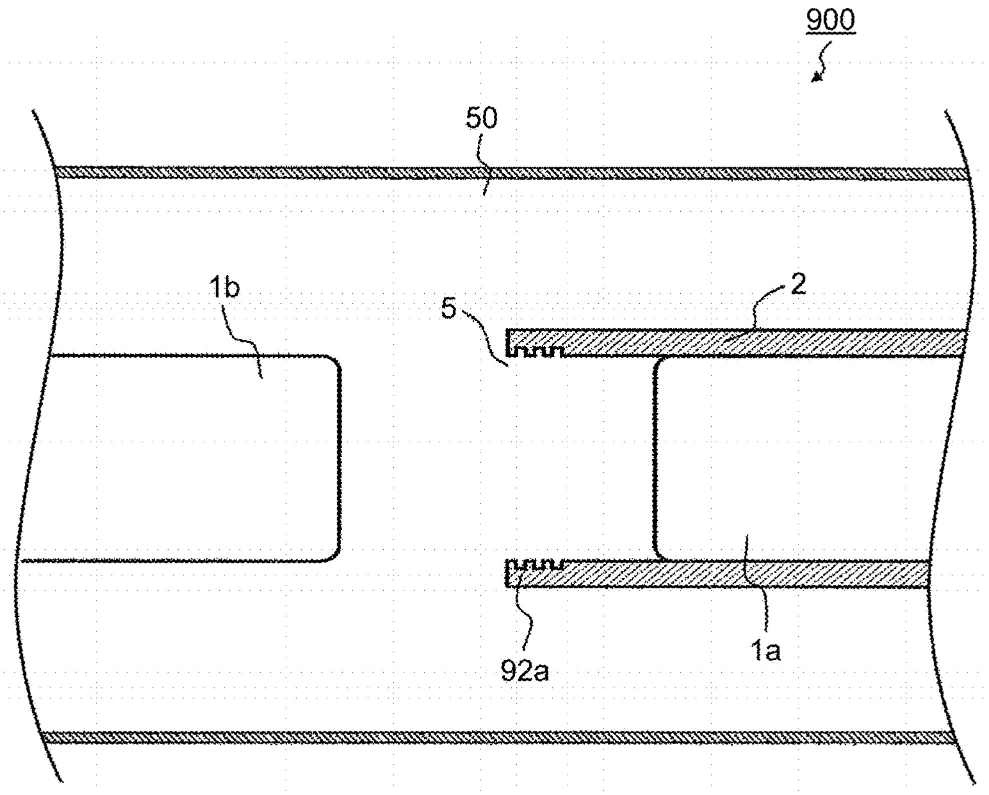
FIG. 17 is a schematic sectional view illustrating an open space in a switching device according to a ninth embodiment.

FIG. 17 is a schematic diagram of a switching device 900 according to the ninth embodiment in an open state, illustrating a section in a right-and-left direction of the drawing that is the direction of movement of a pair of electrodes of the switching device 900 into or out of contact with each other. FIG. 17 illustrates the fully opened and insulated state of the switching device 900.

As illustrated in FIG. 17, the switching device 900 includes the electrode housing 2, the first electrode 1*a*, and the second electrode 1*b*, inside the tank 50 enclosing an insulating gas. The electrode housing 2 has the opening 5. The first electrode 1*a* is provided inside the electrode housing 2. The second electrode 1*b* fits in the opening 5 of the electrode housing 2 in an insertable and detachable manner such that the second electrode 1*b* comes into and out of contact with the first electrode 1*a* inside the electrode housing 2.

As compared with the electrode housing of the switching device 100 according to the first embodiment, the electrode housing of the switching device 900 according to the ninth embodiment has an inside-diameter surface of a different shape.

The second electrode 1*b* moves in the left-right direction of the drawing in such a manner as to come into or out of contact with the first electrode 1*a*. The electrode housing 2 has an electrode housing end 92*a* in a leftward opening direction of the drawing in which the second electrode is separated from the first electrode. The electrode housing end 92*a* is an end on the side of the opening 5. As illustrated in FIG. 17, the electrode housing end 92*a* has an inside-diameter surface having grooves formed thereon.

When the first and second electrodes 1*a* and 1*b* are separated from each other, an arc is generated between the first electrode 1*a* and the second electrode 1*b* in an enclosed space defined by the first electrode 1*a*, the second electrode 1*b*, and the electrode housing 2, and an ablation gas is generated from the electrode housing 2 through arc discharge light. The first and second electrodes 1*a* and 1*b* are further separated from each other and bring the enclosed space to an opened space, whereupon a gas including the ablation gas retained in the enclosed space is blown onto the arc.

Since the inside-diameter surface of the electrode housing end 92*a* has the grooves formed thereon, the gas blown onto the arc is discharged across the grooved inside-diameter surface of the electrode housing end 92*a*, thus producing turbulence.

While the grooves of the inside-diameter surface of the electrode housing end 92*a* extend in a peripheral direction of the inside-diameter surface of the electrode housing end 92*a* in the example of FIG. 17, the grooves need only to extend in a direction intersecting the direction of movement of the second electrode 1*b*. In this way, turbulence can be generated with respect to the direction in which the gas flows when the enclosed space becomes the opened space, thereby facilitating cooling of the arc. The grooves may be provided along the entire periphery of the inside-diameter surface of the electrode housing end 92*a* or along a portion of the entire periphery.

The switching device according to the ninth embodiment has the same effects as that of the first embodiment.

Furthermore, the grooves formed on the inside-diameter surface of the electrode housing produce the turbulence in the gas blown onto the arc and facilitates the cooling of the arc, as compared to the first embodiment, thereby further improving arc extinguishing performance.

Tenth Embodiment

In a tenth embodiment, the same reference characters are used for elements identical or similar to those in the first embodiment of the present disclosure, and descriptions of identical or corresponding parts are omitted. With reference to the drawings, a description is hereinafter provided of a switching device according to the tenth embodiment.

Figure 18:
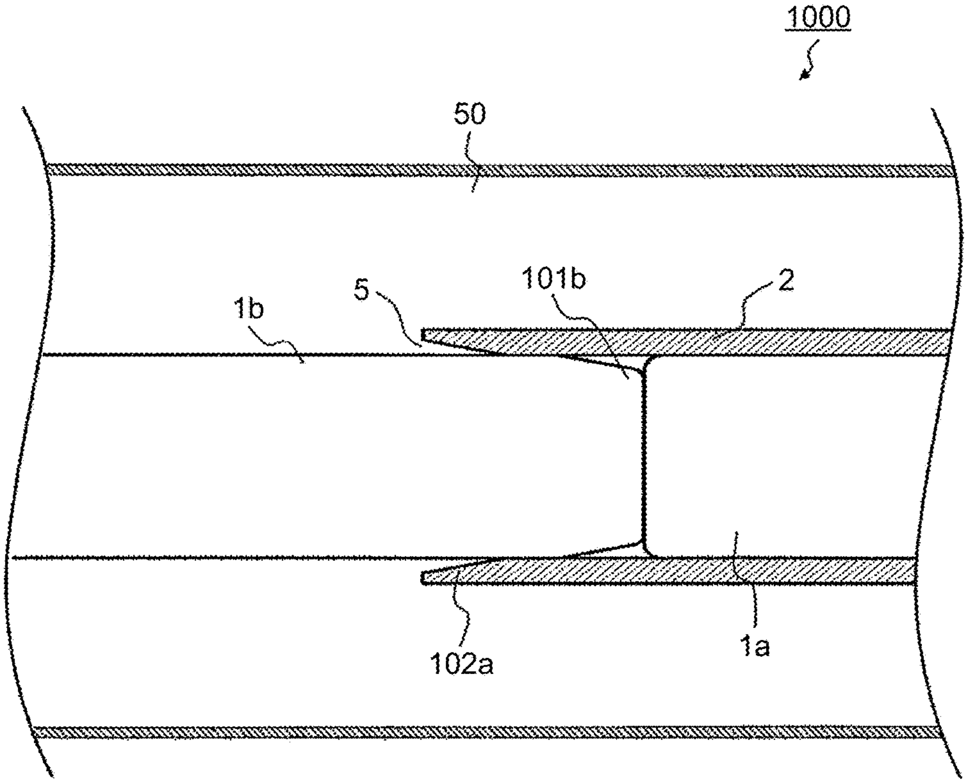
FIG. 18 is a schematic sectional view illustrating a closed state of a switching device according to a tenth embodiment.
Figure 19:
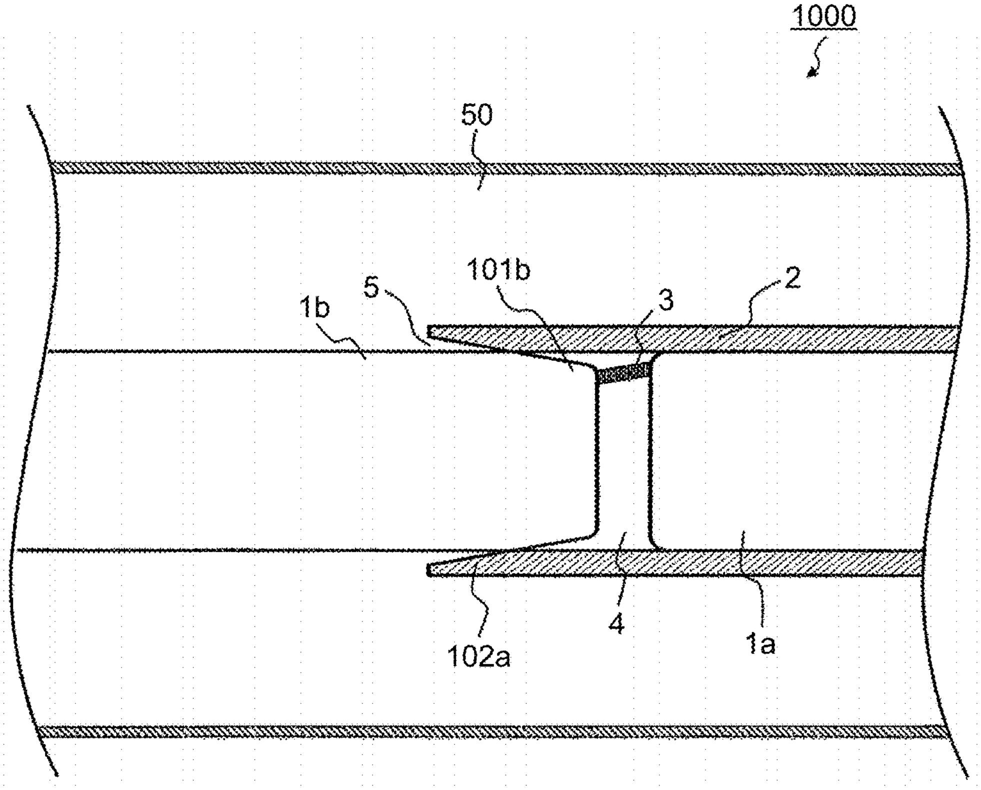
FIG. 19 is a schematic sectional view illustrating an open state of an internal space of the switching device according to the tenth embodiment.
Figure 20:
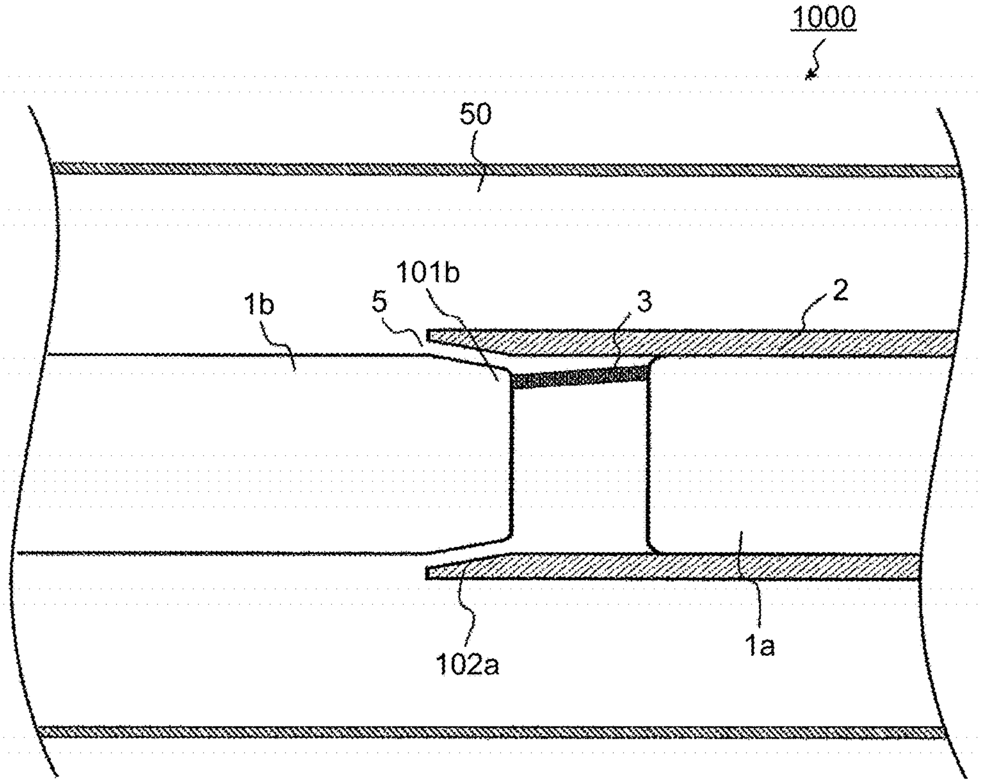
FIG. 20 is a schematic sectional view illustrating an open state of the switching device according to the tenth embodiment.

FIGS. 18, 19, and 20 each illustrate a switching device 1000 according to the tenth embodiment in a closed state, a partially open state with an enclosed space during interruption, and an open state after an opening action advances out of the enclosed space. FIGS. 18 to 20 are schematic diagrams illustrating sections in a right-and-left direction of the drawing that is the direction of movement of a pair of electrodes into or out of contact with each other.

FIG. 18 is a schematic sectional view illustrating the closed state of the switching device 1000 according to the tenth embodiment with the pair of electrodes in contact with each other just before the electrodes are separated from each other.

As illustrated in FIG. 18, the switching device 1000 includes the electrode housing 2, the first electrode 1*a*, and the second electrode 1*b*, inside the tank 50 enclosing an insulating gas. The electrode housing 2 having the opening 5. The first electrode 1*a* is provided inside the electrode housing 2. The second electrode 1*b* fits in the opening 5 of the electrode housing 2 in an insertable and detachable manner such that the second electrode 1*b* comes into and out of contact with the first electrode 1*a* inside the electrode housing 2.

The second electrode 1*b* has a second-electrode end 101*b* that is an end to contact the first electrode 1*a*. The second electrode 1*b* moves in the left-right direction of the drawing in such a manner as to come into or out of contact with the first electrode 1*a*. The electrode housing 2 has an electrode housing end 102*a* in a leftward opening direction of the drawing in which the second electrode is separated from the first electrode. The electrode housing end 102*a* is an end on the side of the opening 5.

The second-electrode end 101*b* has an outside-diameter surface conformed in shape to an inside-diameter surface of the electrode housing end 102*a*.

FIG. 19 is a schematic sectional view illustrating the open state of the switching device 1000 with a sealed space, i.e., the enclosed space 4 defined by the first electrode 1*a*, the second electrode 1*b*, and the electrode housing 2 as a result of the separation of the first and second electrodes 1*a* and 1*b* out of contact with each other.

In FIG. 19, the second-electrode end 101*b* is separated from the first electrode 1*a* and becomes closer to the electrode housing end 102*a* of the electrode housing 2. The second electrode 1*b* is separated from the first electrode 1*a* by moving in the direction opposite to the first electrode 1*a*, namely in the leftward opening direction of the drawing. At the same time as that separation, an arc 3 is struck between the electrodes. In other words, the arc 3 is generated between the first electrode 1*a* and the second electrode 1*b* in the enclosed space 4. The opening action of the first and second electrodes 1*a* and 1*b* progresses leaving the enclosed space 4 formed, such that the first electrode 1*a* and the second electrode 1*b* become separated from each other by a certain distance.

During the progression of the opening action, the arc 3 causes the electrode housing 2 to generate an ablation gas. A gas including the ablation gas and the insulating gas is retained in the enclosed space 4. This increasing ablation gas promotes cooling of the arc 3. Furthermore, the increasing ablation gas increases a pressure in the enclosed space 4 to a higher pressure.

FIG. 20 illustrates the open state of the switching device 1000 with the first and second electrodes 1*a* and 1*b* further separated from each other.

The open state advances by the further movement of the second electrode 1*b* in the direction opposite to the first electrode 1*a*. When a distance by which the first electrode 1*a* and the second electrode 1*b* are separated from each other exceeds the certain distance, the opening 5 appears between the second-electrode end 101*b* of the second electrode 1*b* and the electrode housing end 102*a*, such that the enclosed space 4 opens through the opening 5 to an open space. The enclosed space 4 is opened and thus becomes an opened space, whereupon the highly pressurized gas in the enclosed space 4 is instantly discharged outward through a gap defined between the opening 5 and the second electrode 1*b* moving away from the opening 5, such that a great amount of the gas serving as an arc quenching means that extinguishes the arc 3 is blown onto the arc 3. With this arc quenching means, the arc 3 is extinguished.

The outside-diameter surface of the second-electrode end 101*b* is conformed in shape to the inside-diameter surface of the electrode housing end 102*a*. As illustrated in FIG. 20, for example, the outside-diameter surface of the second-electrode end 101*b* and the inside-diameter surface of the electrode housing end 102*a* are inclined surfaces that parallel each other facing each other. Since a flow passage for the gas to be blown from the enclosed space 4 to the opening 5 is uniform in width, the gas has an increased velocity, resulting in an improvement in extinguishing performance for the arc 3.

The switching device according to the tenth embodiment has the same effects as that of the first embodiment.

Furthermore, since the flow passage for the gas to be blown from the enclosed space 4 to the opening 5 is uniform in width, the gas blown onto the arc 3 has the increased velocity, as compared to the first embodiment, thereby further improving arc extinguishing performance.

Eleventh Embodiment

In an eleventh embodiment, the same reference characters are used for elements identical or similar to those in the first embodiment of the present disclosure, and descriptions of identical or corresponding parts are omitted. With reference to the drawing, a description is hereinafter provided of a switching device 1100 according to the eleventh embodiment.

Figure 21:
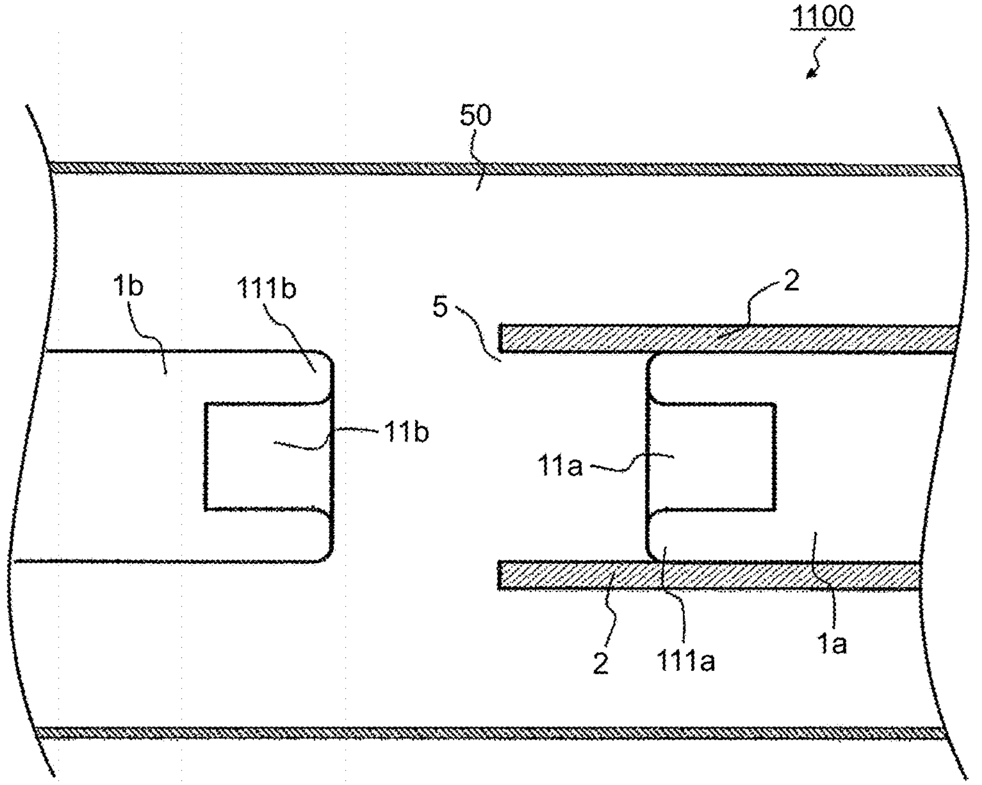
FIG. 21 is a schematic sectional view illustrating an open state of a switching device according to an eleventh embodiment.

FIG. 21 is a schematic sectional view of the switching device 1100 according to the eleventh embodiment in an open state, illustrating the fully opened and insulated state of the switching device 1100.

As illustrated in FIG. 21, the switching device 1100 includes the electrode housing 2, the first electrode 1*a*, and the second electrode 1*b*, inside the tank 50 enclosing an insulating gas. The electrode housing 2 has the opening 5. The first electrode 1*a* is provided inside the electrode housing 2. The second electrode 1*b* fits in the opening 5 of the electrode housing 2 in an insertable and detachable manner such that the second electrode 1*b* comes into and out of contact with the first electrode 1*a* inside the electrode housing 2.

As compared with the electrodes of the switching device 100 according to the first embodiment, the electrodes of the switching device 1100 according to the eleventh embodiment have portions recessed inwardly from their surfaces facing the enclosed space 4. These recessed portions are formed as gas reservoirs defining gas retaining spaces.

As illustrated in FIG. 21, the first electrode 1*a* and the second electrode 1*b* have a first-electrode end 111*a* and a second-electrode end 111*b*, respectively, that are ends facing each other.

The gas reservoirs include a first gas reservoir 11*a* formed on the surface of the first-electrode end 111*a* and a second gas reservoir 11*b* formed on the surface of the second-electrode end 111*b*. The first and second gas reservoirs 11*a* and 11*b* illustrated in FIG. 21 are provided on the face-to-face surfaces of the pair of electrodes.

The first and second electrodes 1*a* and 1*b*, which contracted each other in closed positions, become separated by a certain distance out of contact with each other, thereby defining the enclosed or sealed space with the electrode housing 2. When a distance by which the first electrode 1*a* and the second electrode 1*b* are separated from each other is less than or equal to the certain distance, the first gas reservoir 11*a* and the second gas reservoir 11*b* are parts of the enclosed space defined by the first electrode 1*a*, the second electrode 1*b*, and the electrode housing 2.

In other words, the enclosed space defined by the first electrode 1*a*, the second electrode 1*b*, and the electrode housing 2 includes a portion as the gas retaining spaces that are the first and second gas reservoirs 11*a* and 11*b*. Since total volume of the enclosed space includes volumes of the gas reservoirs, the enclosed space has a larger maximum volume.

While the first and second gas reservoirs 11*a* and 11*b* illustrated in FIG. 21 substantially have the same diameter, sizes of the first and second gas reservoirs 11*a* and 11*b* are changeable as needed.

Furthermore, forming a recess as a gas reservoir in the surface of at least one of the first and second electrodes 1*a* and 1*b* can increase a maximum volume of the enclosed space. For example, only one of the first and second gas reservoirs 11*a* and 11*b* illustrated in FIG. 21 may be provided.

While the gas reservoirs illustrated in FIG. 21 are recessed inwardly from the surfaces of the face-to-face ends of the electrodes, the gas reservoirs may be provided in any locations, provided that the gas reservoirs are the parts of the formed enclosed space as the gas retaining spaces. For example, when the ends of the electrodes have different diameters as in the second or third embodiment, the electrode may have recessed portions as gas reservoirs provided on a side surface thereof facing the electrode housing.

The switching device according to the eleventh embodiment has the same effects as that of the first embodiment.

Furthermore, with the increased maximum volume of the enclosed space, as compared to the first embodiment, an increased amount of gas is blown from the enclosed space onto an arc 3, thus further improving arc extinguishing performance.

Twelfth Embodiment

In a twelfth embodiment, the same reference characters are used for elements identical or similar to those in the first embodiment of the present disclosure, and descriptions of identical or corresponding parts are omitted. With reference to the drawing, a description is hereinafter provided of a switching device 1200 according to the twelfth embodiment.

Figure 22:
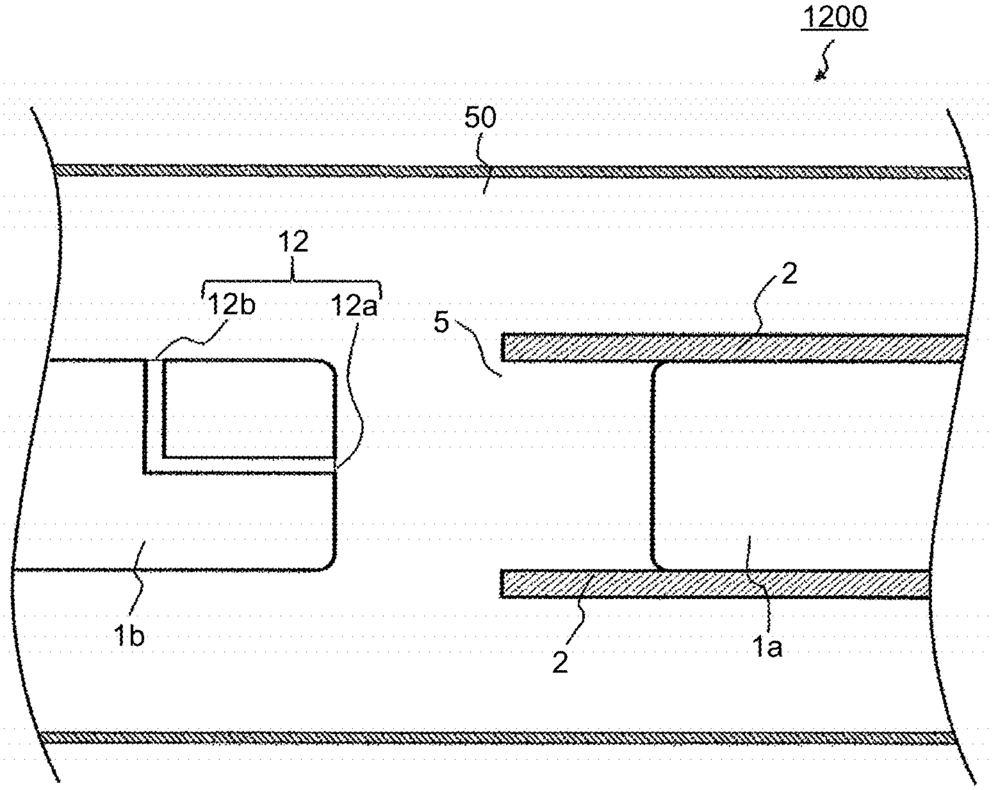
FIG. 22 is a schematic sectional view illustrating an open state of a switching device according to a twelfth embodiment.

FIG. 22 is a schematic diagram of a switching device 1200 according to the twelfth embodiment in an open state, illustrating a section in a right-and-left direction of the drawing that is the direction of movement of a pair of electrodes of the switching device 1200 into or out of contact with each other. FIG. 22 illustrates the fully opened and insulated state of the switching device 1200.

As illustrated in FIG. 22, the switching device 1200 includes the electrode housing 2, the first electrode 1*a*, and the second electrode 1*b*, inside the tank 50 enclosing an insulating gas. The electrode housing 2 has the opening 5. The first electrode 1*a* is provided inside the electrode housing 2. The second electrode 1*b* fits in the opening 5 of the electrode housing 2 in an insertable and detachable manner such that the second electrode 1*b* comes into and out of contact with the first electrode 1*a* inside the electrode housing 2.

As compared with the electrode of the switching device 100 according to the first embodiment, the electrode of the switching device 1200 according to the twelfth embodiment has a ventilation part formed therein for communication between an enclosed space and a space external to the enclosed space.

As illustrated in FIG. 22, the second electrode 1*b* has a ventilation part 12 formed therethrough, and the ventilation part 12 has two vents 12*a* and 12*b* provided on surfaces of the second electrode 1*b*. The vents 12*a* and 12*b* are formed in such a manner as to communicate with each other through the inside of the second electrode 1*b*.

The vent 12*a* is provided on the end surface of the second electrode 1*b* that faces the first electrode 1*a*. When the first and second electrodes 1*a* and 1*b*, which contacted each other in their closed positions, become separated from each other by a certain distance and define the enclosed or sealed space with the electrode housing 2, the vent 12*a* is exposed to the enclosed space, but the second vent 12*b* is exposed to the space external to the enclosed space.

When a distance by which the first electrode 1*a* and the second electrode 1*b* are separated from each other is less than or equal to the certain distance, the ventilation part 12 brings the enclosed space and the space external to the enclosed space into communication with each other via the vents 12*a* and 12*b*.

In order for the ventilation part 12 to prevent a gas flow from the enclosed space to the space external to the enclosed space, a check valve (not illustrated) is attached to both the vents 12*a* and 12*b* or to one of the vents 12*a* and 12*b*.

When a pressure in the enclosed space becomes negative with respect to that of the space external to the enclosed space after arc extinction, the first and second electrodes 1*a* and 1*b* may be attracted to each other and thus fail to be placed in open positions.

The check valve provided for the ventilation part 12 prevents the gas flow from the enclosed space toward the space external to the enclosed space. When a pressure difference between the enclosed space and the space external to the enclosed space becomes greater than or equal to a predetermined pressure difference, the check valve opens to allow a gas flow from the space external to the enclosed space toward the enclosed space. The gas flow from the space external to the enclosed space through the ventilation part 12 into the enclosed space enables the pressure in the enclosed space to return to a normal state in which the electrodes can be placed in open and closed positions.

When the pressure difference between the enclosed space and the space external to the enclosed space becomes greater than or equal to the predetermined pressure difference, which is, for example, 2%, the attached check valve opens to allow the gas flow from the space external to the enclosed space toward the enclosed space. It is to be noted that the predetermined pressure difference mentioned here is not limited to 2% and may be, for example, 5% or 10%.

The ventilation part 12 may be installed in the electrode housing 2 or the first electrode 1*a*, provided that the ventilation part 12 allows the communication between the enclosed space and the space external to the enclosed space.

The switching device according to the twelfth embodiment has the same effects as that of the first embodiment.

Furthermore, since the ventilation part provided with the check valve (s) formed to bring the enclosed space and the space external to the enclosed space into communication with each other, it becomes possible to control the electrode separation, preventing an anomaly that might be caused by the pressure in the enclosed space during opening.

The above configurations illustrated in the embodiments are illustrative of contents of the present disclosure, can be combined with other techniques that are publicly known, and can be partly omitted or changed without departing from the gist of the present disclosure.

REFERENCE SIGNS LIST

1*a* first electrode; 1*b* second electrode; 2 electrode housing; 2*a*, 72*a*, 82*a*, 92*a*, 102*a* electrode housing end; 3, 3*a*, 3*b* arc; 4 enclosed space; 5 opening; 6*a* first magnetic field; 6*b* second magnetic field; 7*a* first permanent magnet; 7*b* second permanent magnet; 8*a* first magnetic body; 8*b* second magnetic body; 9*a* first electric field limiting member; 9*b* second electric field limiting member; 10*a* first arc extinguishing member; 10*b* second arc extinguishing member; 11*a* first gas reservoir; 11*b* second gas reservoir; 12 ventilation part; 12*a*, 12*b* vent; 21*a*, 31*a* first-electrode end; 21*b*, 101*b* second-electrode end; 100, 200, 300, 400, 500, 600, 700, 800, 900, 1000, 1100, 1200 switching device.

The invention claimed is:

1. A switching device comprising:

an electrode housing having an opening;

a first electrode provided inside the electrode housing; and a second electrode to fit in the opening of the electrode housing in an insertable and detachable manner such that the second electrode comes into and out of contact with the first electrode inside the electrode housing, wherein the first electrode has a first-electrode end, and the second electrode has a second-electrode end protruding in a direction toward a space between the first-electrode end and the electrode housing, the second-electrode end having an inside diameter larger than an outside diameter of the first-electrode end and an outside diameter smaller than an inside diameter of the electrode housing, the second-electrode end of the second electrode defines a recessed internal space, with the first and second electrodes in contact with each other, the second-electrode end extends between a periphery of the first electrode and the electrode housing, the first-electrode end of the first electrode being inserted into the recessed internal space of the second-electrode end of the second electrode, such that the first electrode and the second electrode fit together, the electrode housing includes an arc extinguisher to generate an ablation gas through an arc generated between the first electrode and the second electrode, until the first electrode and the second electrode become separated by a certain distance out of contact with each other, a gas including the ablation gas is retained in an enclosed space defined by the first electrode, the second electrode, and the electrode housing, the enclosed space includes a space between the first electrode and the electrode housing, and the recessed internal space defined by the second-electrode end of the second electrode, when a distance by which the first electrode and the second electrode are separated from each other exceeds the certain distance, the gas in the enclosed space flows in first and second gas flow directions and is discharged through a gap defined between the opening and the second electrode moving away from the opening located outside the second electrode, such that the gas is blown onto the arc, and the first gas flow direction is a direction from the recessed internal space of the second-electrode end toward the gap between the opening and the second-electrode end such that the gas flowing in the first gas flow direction intersects the arc generated between the first electrode and the second electrode, and the gas flows in the second gas flow direction from a space between the electrode housing and the first electrode toward the gap between the opening and the second-electrode end.

2. The switching device according to claim 1, wherein:

the electrode housing includes the arc extinguisher defining a surface thereof exposed to the enclosed space.

3. The switching device according to claim 1, wherein:

at least one of the first electrode and the second electrode includes the arc extinguisher defining a surface thereof exposed to the enclosed space.

4. The switching device according to claim 1, wherein:

the electrode housing is defined by the arc extinguisher to generate the ablation gas through the arc generated between the first electrode and the second electrode, the arc extinguisher extending from a position where the first electrode and the second electrode contact to the opening and covering the first electrode and the second electrode in a peripheral direction.

* * * * *